(12) United States Patent
Yaman et al.

(10) Patent No.: US 11,396,464 B2
(45) Date of Patent: Jul. 26, 2022

(54) RESIDENTIAL WATER TREATMENT AND RECYCLE SYSTEM

(71) Applicant: Imam Abdulrahman Bin Faisal University, Dammam (SA)

(72) Inventors: Cevat Yaman, Dammam (SA); Omer Aga, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 23 days.

(21) Appl. No.: 17/153,968

(22) Filed: Jan. 21, 2021

(65) Prior Publication Data

US 2021/0139358 A1 May 13, 2021

Related U.S. Application Data

(63) Continuation of application No. 16/567,348, filed on Sep. 11, 2019, now Pat. No. 10,961,139.

(51) Int. Cl.
*C02F 3/04* (2006.01)
*C02F 3/10* (2006.01)
(Continued)

(52) U.S. Cl.
CPC .................. *C02F 3/04* (2013.01); *C02F 1/40* (2013.01); *C02F 3/101* (2013.01); *C02F 3/103* (2013.01);
(Continued)

(58) Field of Classification Search
CPC .... C02F 3/04; C02F 1/40; C02F 3/101; C02F 3/103; C02F 3/104; C02F 3/288;
(Continued)

(56) References Cited

U.S. PATENT DOCUMENTS 5,108,614 A    4/1992   Ross
5,589,257 A    12/1996   Carriker
(Continued)

FOREIGN PATENT DOCUMENTS

CN     101224923 B    8/2010
CN     206599509 U    10/2017
(Continued)

OTHER PUBLICATIONS

Korkut, et al. ; Geotextiles as Biofilm Attachment Baffles for Wastewater Treatment ; Drexel University Thesis for Doctor of Philosophy ; Jun. 2003 ; 211 Pages.
(Continued)

*Primary Examiner* — Fred Prince
(74) *Attorney, Agent, or Firm* — Oblon, McClelland, Maier & Neustadt, L.L.P.

(57) ABSTRACT

Water treatment structures may have at least a first geotextile fabric layer; a second geotextile fabric layer; a third geotextile fabric layer; a first filler layer with plastic particles, arranged between the first and second geotextile fabric layers; and a second filler layer with plastic particles, arranged between the second and third geotextile fabric layers, wherein the geotextile fabric layers and the filler layers are within a housing, and wherein the structure is configured such that contaminated water proceeds sequentially through the first geotextile fabric layer, the first filler layer, the second geotextile fabric layer, the second filler layer, and the third geotextile fabric layer. Methods of treating wastewater may involve passing wastewater, after optional oxygenating and pre-filtering, through such alternating layers of geotextile, preferably nonwoven, and polymer particles.

9 Claims, 6 Drawing Sheets

(51) Int. Cl.
*C02F 3/30* (2006.01)
*C02F 1/40* (2006.01)
*C02F 3/28* (2006.01)
*C02F 3/00* (2006.01)

(52) U.S. Cl.
CPC ............... *C02F 3/104* (2013.01); *C02F 3/288* (2013.01); *C02F 3/30* (2013.01); *C02F 2003/001* (2013.01); *C02F 2301/046* (2013.01)

(58) Field of Classification Search
CPC .................. C02F 3/30; C02F 2003/001; C02F 2301/046; C02F 3/301; C02F 3/302; Y02W 10/10; Y02W 10/37
USPC ....... 210/615, 616, 617, 150, 151, 264, 283, 210/284, 290, 532.2, 903
See application file for complete search history.

(56) References Cited

U.S. PATENT DOCUMENTS

| | | | |
|---|---|---|---|
| 6,100,081 A * | 8/2000 | Buelna | B01D 53/85 210/150 |
| 6,383,373 B1 | 5/2002 | Nakao et al. | |
| 6,428,691 B1 * | 8/2002 | Wofford | C02F 3/04 210/259 |
| 7,037,423 B2 | 5/2006 | Herman | |
| 7,374,670 B2 * | 5/2008 | Potts | C02F 3/02 210/150 |
| 7,465,390 B2 * | 12/2008 | Potts | C02F 3/046 210/151 |
| 7,479,221 B2 * | 1/2009 | Paoluccio | E03F 1/00 210/163 |
| 10,961,139 B1 * | 3/2021 | Yaman | C02F 3/104 |
| 2002/0023871 A1 | 2/2002 | Talbot | |
| 2003/0116488 A1 | 6/2003 | Cameron | |
| 2010/0096333 A1 | 4/2010 | Foreman | |
| 2011/0284438 A1 | 11/2011 | Jowett | |
| 2014/0353225 A1 | 12/2014 | Harvey | |
| 2015/0329396 A1 * | 11/2015 | Presby | C02F 1/44 210/194 |

FOREIGN PATENT DOCUMENTS

| | | |
|---|---|---|
| CN | 108867612 A | 11/2018 |
| JP | 8-294699 | 11/1996 |

OTHER PUBLICATIONS

Yaman ; Geotextile Biofilters for Wastewater Treatment ; Conference Paper ; Jan. 2005 ; 17 Pages.

* cited by examiner

RESIDENTIAL WATER TREATMENT AND RECYCLE SYSTEM

CROSS-REFERENCE TO RELATED APPLICATIONS

The present application is a Continuation of Ser. No. 16/567,348, now U.S. Pat. No. 10,961,139, having a filing date of Sep. 11, 2019.

BACKGROUND OF THE INVENTION

Field of the Invention

The present disclosure relates to water purification systems, particularly those for the treatment of domestic wastewater, such as household and/or business sewer and wastewater.

Description of the Related Art

Millions of homes in the world and about 25% in the US are not connected to a local (centralized) sewer system. Homes without sewer connections have to either store their wastewater in septic tanks or treat their wastewater on-site, discharging either to groundwater or to a nearby surface water. There are several known treatment systems available for on-site wastewater treatment. The oldest known treatment technique is a filter that contains a filter bed of layered sand and gravel. However, there are several limitations with sand filters, including inefficient treatment and clogging of the filter bed. To eliminate these limitations, synthetic filters have been developed in last decades. Synthetic filters are compact, lightweight, and effective.

An idealized two-dimensional projection of a continuous biofilm that adheres to geotextile fibers, e.g., a boundary biofilm similar to the slime layer that coats the surfaces of granular filters, is seen in FIG. 1A. In the model in FIG. 1A, increasing the biomass thickens the film which thus encroaches on the liquid transport channels. Increasing the biomass also reduces the contact area between permeating influent and the biofilm, reducing mass transfer, and presumably, reducing the treatment efficiency. This effect could lead to clogging from accumulation of inactive residual organic waste.

Polyester (PET) or polypropylene (PP) geotextile fibers are hydrophobic, with complex pore structures. Suspended solid particles carrying attached microorganisms may become entrapped while percolating through a matrix with varying pore sizes, by sufficient immobilized particles at a restrictive channel arresting particle convection. Such convection arrest can result in minimal contact with the fiber "cage" except at the downstream end. Total suspended solids (TSS) can include attached microorganisms, which can use the solid and passing solutes as substrates to construct an individual floc (i.e., flocculation or flocculent at least semi-solid, rather than a continuous biofilm). Biomass having floc morphology generally "rattles" in a pore, until it agglomerates with or connects to another floc in an adjacent pore. The result of such agglomeration may be that water conveying fresh, dissolved, or colloidal substrate, circulates in laminar flow around the biomass, which may have a higher specific surface for substrate transfer than the boundary biofilm of FIG. 1B. Moreover, neither the drag surface area nor pore blockage would increase as fast as biomass growth, thereby limiting the permeability loss. Thus, the morphology of the biomass is influential in assessing the threshold at which increased organic retention becomes deleterious. Such morphology is still more complex in geotextiles with a third dimension, i.e., interior porosity.

Conventional sand filters may not be able to reduce carbonaceous and nitrogenous compounds from the residential wastewaters to sufficient levels. The unremoved compounds can contaminate the water body, e.g., groundwater or surface water, to which the treated effluent is discharged. Nitrogenous compounds are especially difficult to remove in conventional sand filters that treat septic effluents. Another disadvantage of conventional sand filters is that they often clog due to the accumulation of solid materials or biofilm, causing flooding, e.g., in the yards or gardens of single homes, which increases the possibility of mosquito breeding and other disease casing agents.

Recent developments in geotextile filters for treating landfill leachate address at least some of the known clogging problems. Certain well-designed layered geotextile systems may be superior to conventional onsite systems in reducing the two basic secondary treatment indicators, total suspended solids (TSS) and 5-day biochemical oxygen demand ($BOD_5$), in nitrifying, and partially denitrifying the effluent. Certain research in the art in this regard warrants discussion.

CN 206599509 U by Zhang et al. (Zhang) discloses a planting island for sewage treatment, with a tube-shaped casing, a waffle slab seal under the casing, ceramic particle packing filler on the waffle slab in the casing, a polystyrene foam layer filler on the ceramic particle packing layer, a polystyrene foam layer top including a geotextile layer, a plastic fiber packing layer on the geotextile layer top, and a plastic net mesh upon the plastic fiber packing layer. Zhang's geotextile can filter, degrade pollutants, and restrain water insoluble pollutants. Zhang's system requires a ceramic particle filler and polymer foams, and Zhang fails to describe multiple geotextile layers, nor polymer particulate fillers, nor nonwovens.

CN 108867612 A by Wang et al. (Wang) discloses a grating reinforced geotechnical filler structure comprising a multi-layered biaxial geogrid and a U-shaped nail fixing the biaxial geogrid, wherein the biaxial geogrid is filled with a geotechnical filler formed through mixing of steel slag and rubber particles. Wang's geotechnical filler structure is prepared from grating reinforced steel slag and the rubber particles via a paving method, using waste steel slag and abandoned tire industrial waste. Wang's system is non-deformable and does not use nonwoven geotextiles or non-elastomeric plastic particles. Moreover, Wang relates to geotechnical applications, not wastewater treatment.

CN 101224923 B by Cui et al. (Cui) discloses a method for filtering and treating domestic sewage by using a multi-level biomembrane. Cui's method mechanically pre-treats and pre-aerates domestic sewage, feeds the domestic sewage into a first level biological prefiltration reaction vessel, feeds the prefiltered sewage into a second level up-flow type double layer biomembrane filtration bed under aeration and oxygenization, and feeds the double-layer filtered sewage into a third biomembrane filtration section. Cui uses three reactors in-series: a first reactor filled with 3 to 5 mm plastic particles for prefiltration; a second reactor with a biomembrane filter and an up-flow floating plastic filter; and a third reactor which is a biomembrane reactor. Cui's biofilm carrier can be ceramsite, quartz sand, volcanic rock, zeolite, or activated carbon, but Cui does not mention geotextiles or nonwovens.

JP H08-294699 A by Katsuyuki (Katsuyuki) discloses a biological denitrification apparatus with fixed beds packed with floatable polyethylene or polypropylene granular filter material with specific gravity of 0.85 to below 1 and preferably a particle size of about 2 to 4 mm, and an inflow part allowing water to be treated to flow in the lower part of a first fixed bed including an intermediate aerator. Katsuyuki does not disclose multiple layers of a geotextile, nor a nonwoven, and Katsuyuki's process is anaerobic.

U.S. Pat. No. 6,383,373 to Nakao et al. (Nakao) discloses a biological filtration apparatus with a raw water introducing section, a biofiltration section for biologically purifying-refining-filtering the raw water yielding processed water, a liquid and gas permeable support section for supporting the biofiltration section, and a water collecting section for the processed water. Nakao's biofiltration section includes a packed bed of hollow carrier resin particles with a specific gravity of 1.01 to 1.2 g/mL. While Nakao may use resin (plastic material) alone, Nakao preferably uses a mixture of a resin and an additive for adjusting specific gravity, such as pulp, waste plastics, zeolite, barium sulfate, and slaked lime. Nakao does not disclose multiple layers of a geotextile, nor a nonwoven.

The doctoral thesis of Eyüp Korkut at Drexel University, entitled "Geotextiles as Biofilm Attachment Baffles for Wastewater Treatment," submitted June 2003, in the Department of Civil, Architectural, and Environmental Engineering (Korkut) discloses a bench scale pilot plant study using geotextile baffles as biofilm attachment media for wastewater treatment. Korkut's system removed suspended solids and hosted growth of microorganisms to absorb and decompose carbonaceous and nitrogenous pollutants from Philadelphia Water Department (PWD) wastewater having combined sanitary and storm sewage. Korkut's once-through hydraulic loading rate was 20 gal/day-sq.ft. Korkut hangs geotextile coupons as baffles transverse to the flow in a sinusoidal pattern to increase path length and contact area, using elements from lamella settlers, granular depth filters, and trickling filters, describing nonwoven needle punched geotextiles to host a substantial biomass. Korkut does not disclose plastic particles, nor multiple layers of nonwoven geotextile, but instead single-layer, vertically hung geotextile filters in a fish tank filled with wastewater similar to a batch reactor.

The North American Geosynthetics Society (NAGS) conference paper and presentation entitled, "Geotextile Biofilters for Wastewater Treatment," by inventor Cevat Yaman (Yaman) from January, 2005, in Las Vegas, Nev., discloses pilot plant study using geotextile filters as biofilm attachment media in wastewater treatment. Yaman's geotextiles filter suspended solids and hosted growth of microorganisms to decompose carbonaceous and nitrogenous compounds. Yaman's 10.16 cm (4 inch) diameter packed columns contain alternating layers of gravel, sand, and geotextile filters. Yaman indicates that nonwoven needle punched geotextiles with complex structures and high internal porosity were suitable for water purification. Yaman describes that primary treatment effluent at a net rate of 365 L/m$^2$·day (9.0 gal/day/ft$^2$) reduced TSS and BOD5 over 90%, $NH_4$ over 90%, and effluent nitrate below 10 mg/L. Yaman does not does not describe plastic particles between layers of geotextile, and Yaman uses only one or two layers of (optionally nonwoven) geotextile.

In light of the above, a need remains for wastewater treatment systems, particularly using lighter materials, such as nonwoven geotextiles and plastic particles, especially polyolefin nonwovens and particles, rather than inorganic particles, and methods of making and using such water treatment systems.

SUMMARY OF THE INVENTION

Aspects of the invention provide water treatment structures, which may comprise: a first geotextile fabric layer; a second geotextile fabric layer; a third geotextile fabric layer; a first filler layer comprising plastic particles, arranged between the first and second geotextile fabric layers; and a second filler layer comprising plastic particles, arranged between the second and third geotextile fabric layers, wherein the geotextile fabric layers and the filler layers are contained within a housing, and wherein the structure is configured such that contaminated water proceeds sequentially through the first geotextile fabric layer, the first filler layer, the second geotextile fabric layer, the second filler layer, and the third geotextile fabric layer. Such water treatment structures may be modified by any permutation of the features described herein, particularly the following.

Inventive water treatment structures may further comprise: a fourth geotextile fabric layer; and a third filler layer comprising plastic particles, arranged between the third and fourth geotextile fabric layers.

The first, second, and/or third geotextile fabric layer may comprise a nonwoven. The first, second, and/or third geotextile fabric layer may comprise a polyolefin and/or polyester nonwoven. The first, second, and/or third geotextile fabric layer may comprise at least 75 wt. %, relative to total fabric layer weight, of a nonwoven that may comprise at least 75 wt. %, relative to total nonwoven weight, of polypropylene or polyethylene terephthalate. The first, second, and/or third geotextile fabric layer, independently may have a thickness in a range of from 1 to 10 mm.

At least 90 wt. % of the plastic particles may be solid plastic. The plastic particles may comprise at least 50 wt. % recycled polymer, relative to total particle weight. The plastic particles may have an average largest dimension in a range of from 5 to 60 mm.

The filler layers may be packed with the plastic particles, such that the geotextile fabric layers require no further structural support within the housing.

Inventive water treatment structures may have a weight per volume, without water and without the housing, of less than 1000 kg/m$^3$.

Aspects of the invention provide wastewater treatment systems, which may comprise any permutation of inventive water treatment structure(s) described herein; and a first separate space, separated by a barrier from the fabric layers and the filler layers, configured to allow an oxygenation of the contaminated water. Such wastewater treatment systems may be modified by any permutation of the features described herein.

Inventive systems may further comprise: a second separate space, separated by a barrier from the fabric layers and the filler layers, configured to collect effluent downstream of the water treatment structure. Inventive systems may further comprise a recycle configured to feed effluent from downstream of the water treatment structure to a point upstream of the water treatment structure. Inventive systems may further comprise a septic tank and/or a solids separation device, upstream of the water treatment structure. Inventive systems may further comprise a device configured to remove organics lighter than water upstream of the water treatment structure. Inventive systems system may further comprise an aeration and/or oxygenation device, configured to introduce oxygen into the contaminated water upstream of the water treatment structure.

Aspects of the invention provide methods for reducing a content of one or more carbonaceous and/or nitrogenous compounds from contaminated water containing the carbonaceous and/or nitrogenous compound(s). Such methods may be modified by any permutation of the features described herein. For example, such methods may comprise: passing a contaminated water, comprising a carbonaceous and/or nitrogenous compound, at least once sequentially through a first geotextile fabric layer, a first filler layer comprising plastic particles, a second geotextile fabric layer, a second filler layer comprising plastic particles, and a third geotextile fabric layer, to obtain an effluent exiting a final layer, wherein the first filler layer is arranged between the first and second geotextile fabric layers, wherein the second filler layer is arranged between the second and third geotextile fabric layers, and wherein the passing reduces a content of the carbonaceous and/or nitrogenous compound in the effluent, relative to the contaminated water. The passing may further comprise passing the contaminated water through a third filler layer, comprising plastic particles, and a fourth geotextile fabric layer, wherein the third filler layer is arranged between the third and fourth geotextile fabric layers. Inventive methods may further comprise recycling the effluent for a second cycle of the passing. The contaminated water may be oxygenated to a dissolved oxygen content at least 3 mg/L.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
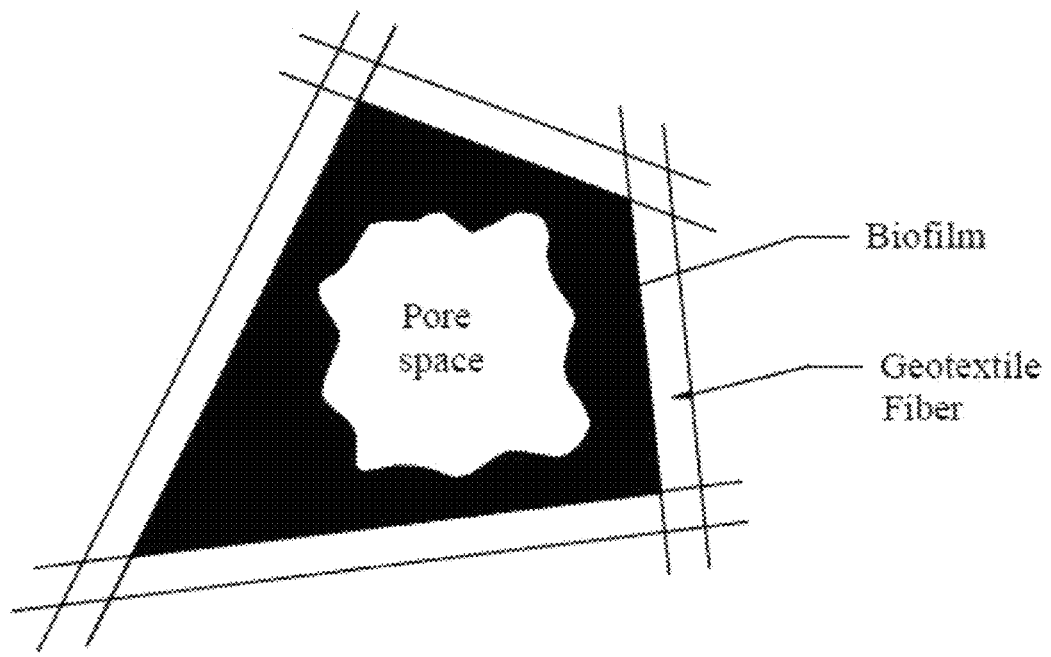
FIG. 1A shows a two-dimensional pictorial representation of an attached biofilm mass within a fiber network represented linearly for simplicity.

Aspects of the invention provide water treatment structures comprising, e.g.: a $1^{st}$, $2^{nd}$, $3^{rd}$, $4^{th}$, $5^{th}$, $6^{th}$, $7^{th}$, $8^{th}$, $9^{th}$, $10^{th}$ (or further) geotextile fabric layer; a $1^{st}$, $2^{nd}$, $3^{rd}$, $4^{th}$, $5^{th}$, $6^{th}$, $7^{th}$, $8^{th}$, $9^{th}$, $10^{th}$ (or further) filler layer comprising plastic particles, arranged between the $1^{st}$ and $2^{nd}$, $2^{nd}$ and $3^{rd}$, $3^{rd}$ and $4^{th}$, $4^{th}$ and $5^{th}$, $5^{th}$ and $6^{th}$, $6^{th}$ and $7^{th}$, $7^{th}$ and $8^{th}$, $8^{th}$ and $9^{th}$, $9^{th}$ and $10^{th}$, ... and/or $n^{th}$ and $(n+1)^{th}$, geotextile fabric layers. The geotextile fabric layers and the filler layers may be contained within a housing of basically unlimited structure, though constructional convenience may urge cylindrical or rectangular prismic structures, optionally with conical bases. Such structure may be configured such that contaminated water proceeds sequentially through the first geotextile fabric layer, the first filler layer, the second geotextile fabric layer, the second filler layer, and the third geotextile fabric layer, etc., until producing an effluent after the final layer, e.g., at the base of the housing or of a wall within the housing containing the geotextile and plastic particle layers. Generally, the structures will contain alternating layers comprising geotextile and layers comprising plastic particles, one immediately contacting the other, generally bound only by the housing and any necessary piping/plumbing elements, e.g., to deliver liquids and gases to the layers, and/or with fixing elements for affixing the geotextile layers to the internal housing walls. Housings may be made of a variety of materials, and, depending upon the application, may be of a plastic, such as PE, PP, or PET, cement or concrete, metal, such as stainless steel, galvanized steel, or copper, or glass. The structures may preferably be located externally to a building, but may also be integrated into a building, even as a structural unit, such as a pylon.

Any or all of the geotextile fabric layers may comprise a nonwoven, which may make out at least 50, 60, 70, 75, 80, 85, 90, 95, 97.5, 98, 99, 99.9, or 100 vol. % of the total fabric layer volume. Relevant nonwovens may comprise at least 75, 80, 85, 90, 91, 92, 92.5, 93, 94, 95, 96, 97, 97.5, 98, 99, 99.1, 99.5, or 99.9 wt. % of a polyolefin and/or polyester, or any other polymer described below, relative to the total weight of the nonwoven. The geotextile fabric layers may independently comprise at least 75, 80, 85, 90, 91, 92, 92.5, 93, 94, 95, 96, 97, 97.5, 98, 99, 99.1, 99.5, or 99.9 wt. %, relative to total fabric layer weight, of a nonwoven that may comprise at least 75, 80, 85, 90, 91, 92, 92.5, 93, 94, 95, 96, 97, 97.5, 98, 99, 99.1, 99.5, or 99.9 wt. %, relative to total nonwoven weight, of polypropylene (PP) or polyethylene terephthalate (PET). That is, the geotextile layer(s) may consist essentially of PP and/or PET nonwovens (i.e., containing only additional components which do not reduce the temporal and/or volumetric decomposition efficiency by any more than 5%). Any or all of the geotextile fabric layers may have a thickness in a range of from 1 to 10 mm, e.g., at least 1, 1.5, 2, 2.25, 2.5, 2.75, 3, 3.25, 3.5, 3.75, or 4 mm and/or up to 10, 9, 8, 7.5, 7, 6.5, 6, 5.75, 5.5, 5.25, 5, 4.75, 4.5, 4.25, 4, 3.75, 3.5, 3.25, or 3 mm.

At least 90, 91, 92, 92.5, 93, 94, 95, 96, 97, 97.5, 98, 99, 99.1, 99.5, or 99.9 wt. % of the plastic particles may be solid plastic, relative to the total plastic particle weight, whereby a remainder may be at least partially hollow, e.g., 95, 90, 85, 80, 75, 70, 65, 60, 55, 50, 45, 40, 37.5, 33, 25, 20, 15, 10, 7.5, 5, 4, 3, 2, 1, or 0.5 vol. % internally vacant, based on the average total particle volume (disregarding external voids). The plastic particles may comprise at least 50, 60, 70, 75, 80, 85, 90, 91, 92, 92.5, 93, 94, 95, 96, 97, 97.5, 98, 99, 99.1, 99.5, or 99.9 wt. % recycled polymer, relative to total particle weight. Such recycled polymers may be a mixture of polymers or a single type of polymer waste, particularly tailoring for a particular density, such as below 1 g/cc or above 1 g/cc, depending upon whether the application would like floating or sinking particles. In addition, the density may be modified based upon the solidity/vacant volume in the particles. The plastic particles may have an average largest dimension in a range of from 5 to 60 mm, e.g., at least 5, 7.5, 10, 12.5, 15, 17.5, or 20 mm and/or up to 60, 50, 45, 40, 35, 30, 25, 20, 17.5, 15, 12.5, or 10 mm.

The filler layers may be packed with the plastic particles, such that the geotextile fabric layers require no further structural support within the housing. The plastic particles are not limited in shape, and may be, for example, spherical, cylindrical prisms, rectangular prisms, triangular prisms, hexagonal prisms, pentagonal prisms, irregular shapes, ovular shapes, elliptical shapes, cubes, etc., or mixtures of these.

Inventive water treatment structures may have a weight per volume, without water and without the housing, of no more than 1000, 975, 950, 945, 940, 935, 930, 925, 900, 875, 850, 800, 750, 700, 650, 600, 550, 500, 450, or 400 kg/m$^3$. For example, inventive structures may have a lower density than PP, i.e., 946 kg/m$^3$.

Aspects of the invention provide wastewater treatment systems, which may comprise any permutation of inventive water treatment structure(s) described herein; and a first separate space, such as an aeration and/or oxygenation tank, separated by a barrier from the fabric layers and the filler layers, configured to allow an oxygenation of the contaminated water. Such a space may take the form of a coil in the pipe leading wastewater to the upstream inlet and/or a coil in the recycle, and/or a tank separate from the piping, wherein the contaminated water and/or effluent may be treated with oxygen-containing gas(es). The first separate space, or portion of the feed and/or recycle, should generally be sufficient to maintain a dissolved oxygen level of at least 3, 3.25, 3.5, 3.75, 4, 4.25, 4.5, 4.75, 5, 5.5, 6, 7, 8, 9, 10, or more mg/L.

Inventive systems may further comprise: a second separate space, separated by a barrier from the fabric layers and the filler layers, configured to collect effluent downstream of the water treatment structure. The second separate space may take the form of a discharge tank (9) as depicted in the exemplary drawings, or may be a conical region gravitationally below the final layer of the primary decomposition tank (10), or a collector of some sort in the proximity of the final downstream layer of the primary decomposition tank (10), e.g., fed by a pipe or feed of some sort at the downstream end of the primary decomposition tank (10).

Inventive systems may further comprise a recycle configured to feed effluent from downstream of the water treatment structure to a point upstream of the water treatment structure. The recycle may comprise a pipe, a conical portion, e.g., of the base of the housing, an inclined portion, e.g., at the base of the housing and/or at the downstream end (e.g., final 15, 12.5, 10, 7.5, 5, 2.5, or 1% of the space of the housing).

Inventive systems may further comprise a septic tank and/or a solids separation device, upstream of the water treatment structure. The septic tank may take the form of a pre-existing tank which was systematically emptied by a municipal and/or commercial service or a body intended to assist in an at least partial decomposition of contaminants in wastewater. A septic tank is not necessary to the inventive system, though at least a device configured to separate off solid matter (e.g., of longest dimension of at least 2.5, 5, 7.5, 10, 12.5, 15, 17.5, or 20 cm) can assist the decomposition of smaller wastewater components. Inventive systems may further comprise a device configured to remove organics lighter than water upstream of the water treatment structure. Such devices may take the form of skimmer(s), and/or gravity separators, which may be conical in form. Alternatively, the separators may include centrifugal components or centrifuges.

Inventive systems system may further comprise an aeration and/or oxygenation device, configured to introduce oxygen into the contaminated water upstream of the water treatment structure. Such devices may take the form of bubblers or other continuous gasification devices, suitable to introduce gas into a liquid stream, e.g., a gas sparger.

Aspects of the invention provide methods for reducing a content of one or more carbonaceous and/or nitrogenous compounds from contaminated water containing the carbonaceous and/or nitrogenous compound(s). Such methods may reduce one, several, or all of carbonaceous compounds and/or nitrogenous compounds. Preferably, all such compounds are reduced to at least below the municipal standards in which the wastewater purification system is located, if not completely eliminate such compounds, e.g., remove at least 75, 80, 85, 90, 91, 92, 92.5, 93, 94, 95, 96, 97, 97.5, 98, 99, 99.1, 99.5, or 99.9 wt. % of a total weight of the carbonaceous and/or nitrogenous compound(s). Such methods may comprise passing a contaminated water, comprising a carbonaceous and/or nitrogenous compound, at least once sequentially through a first geotextile fabric layer, a first filler layer comprising plastic particles, a second geotextile fabric layer, a second filler layer comprising plastic particles, a third geotextile fabric layer, etc., to obtain an effluent exiting a final layer, wherein the first filler layer is arranged between the first and second geotextile fabric layers, wherein the second filler layer is arranged between the second and third geotextile fabric layers, and wherein the passing reduces a content of the carbonaceous and/or nitrogenous compound in the effluent, relative to the contaminated water. The method may comprise 3, 4, 5, 6, 7, 8, . . . 15 (or more) geotextile layers including intervening plastic particle layers and the initial layer may be either a geotextile or a layer of plastic particles as described anywhere herein.

Inventive methods may further comprise recycling the effluent for a second, third, fourth, fifth, sixth, seventh, eighth, ninth, tenth . . . cycle of the passing, depending upon the number of layers and/or height of the column through which the contaminated water passes. For example, if the primary decomposition tank comprises four geotextile layers with intervening plastic particle layers, the system may use 3 recycles (4 cycles) to achieve the desired purification, though a column with eight geotextile layers with intervening plastic particle layers may require only two cycles, and a column with 14 to 16 geotextile layers with intervening plastic particle layers may not require any recycling (though such columns may require more vertical and/or cross-sectional space). A typical "dual layer" height, i.e., the thickness of a geotextile layer and plastic particle layer, may be, for example, at least 1, 1.25, 1.5, 1.75, 2, 2.25, 2.5, 2.75, 3, 3.25, 3.5, 3.75, or 4 ft and/or up to 6, 5.75, 5.5, 5.25, 5, 4.75, 4.5, 4.25, 4, 3.75, 3.5, 3.25, 3, 2.75, 2.5, 2.25, or 2 ft. Correspondingly, a height of an aeration tank and/or discharge tank may be independently, e.g., at least 0.5, 0.75, 1, 1.25, 1.5, 1.75, 2, 2.25, or 2.5 ft. and/or up to 4, 3.75, 3.5, 3.25, 3, 2.75, 2.5, 2.25, 2, 1.75, or 1.5 ft.

The contaminated water may be oxygenated, e.g., with a sparger and/or with an aeration or oxygenation tank, to a dissolved oxygen content at least 3, 3.1, 3.2, 3.333, 3.4, 3.5, 3.6, 3.75, 4, 4.25, 4.5, 5, 7.5, or 10 mg/L (or more). The oxygenation may be achieved with air, compressed air, oxygen-enriched compressed air, and/or at least 50, 60, 70, 75, 80, 85, 90, 95, 97.5, 98, 99, 99.1, or 99.5 vol. % oxygen.

Inventive systems need not comprise any ceramic, ceramsite, metal (e.g., steel), rubber, stone, mineral, glass, gravel, sand, quartz sand, filter sand, anthracite, garnet, volcanic rock, zeolite, activated carbon, steel slag, $BaSO_4$, and/or $CaCO_3$, within the walls of the decomposition tank, or may comprise no more than 40, 33, 25, 20, 15, 10, 7.5, 5, 4, 3, 2, 1, or 0.5 wt. %, relative to the total packing weight, of any of these, individually or in combination.

Inventive systems need not comprise any elastomer(s) (e.g., natural rubber, SBN, polybutadiene, etc.), polymer foam(s) (e.g., polystyrene foam, polyurethane foam, polyolefin foam, etc.), and/or polystyrene, in the within the walls of the decomposition tank, or may comprise no more than 5, 4, 3, 2.5, 2, 1, 0.5, 0.1, 0.01, 0.001, 0.0001, or 0.00001 wt. %, relative to total polymer packing weight, of elastomers, polymer foam(s), and/or polystyrene, individually or in combination.

Inventive systems need not employ aquatic plants, such as reed, calamus, and canna, or may comprise no more than 5, 4, 3, 2.5, 2, 1, 0.5, 0.1, 0.01, 0.001, 0.0001, or 0.00001 wt. %, relative to the total packing content weight (excluding wastewater), of such plants, individually or in combination.

Relevant materials for geotextiles and fabrics useful within the invention, particularly nonwovens may include homopolymers, copolymers, and/or terpolymers (or blends of any of these) of acrylics—such as methyl methacrylate, methyl acrylate, ethyl methacrylate, ethyl acrylate, acrylonitrile, acrylic acid, methacrylic acid, 2-ethylhexyl acrylate, hydroxyethyl methacrylate, butyl acrylate, butyl methacrylate, and/or trimethylolpropane triacrylate (TMPTA); olefins—such as ethylene, propylene, 1-butene, isobutene, 1,3-butadiene, isoprene, and/or tetrafluoroethylene; halomonomers—such as vinyl chloride, vinylidene fluoride, tetrafluoroethylene, chlorotrifluoroethylene, hexafluoropropylene oxide, perfluoro(methyl vinyl ether) ($CF_2$=$CFOCF_3$), perfluoro(ethyl vinyl ether) ($CF_2$=$CFOCF_2CF_3$); vinyl monomers—such as vinyl chloride, 2-chloroethyl vinyl ether, vinyl alcohol, vinylidene dichloride, vinylidene difluoride, and/or vinyl acetate (or other esters); polyamides—such as polymers of dodecanediamine, decanediamine, octanediamine, hexamethylenediamine, tetramethylendiamine, caprolactam, 11-aminoundecanoic, terephthalic acid, 1,5-pentanedioic acid (glutaric acid), 1,6-hexanedioic acid (adipic acid), 1,7-heptanedioic acid (pimelic acid), 1,8-octanedioic acid (suberic acid), 1,9-nonanedioic acid (azelaic acid), 1,10-decanedioic acid (sebacic acid), 1,11-undecanedioic acid, 1,12-dodecanedioic acid, 1,13-tridecanedioic acid (brassylic acid), m-xylylenediamine, paraphenylenediamine, terephthalic acid, 1,10-decamethylendiamine, and/or dodecano-12-lactam (lauric lactam), e.g., PA 6 (or nylon 6), PA 12, PA 6,6, PA 6T, PA 1,6, PA 6,9, PA 6,12, PA 11, PA 4,6, PA 12,12, PA 10,10, etc.; polyesters—such as polyethylene terephthalate (PET), polybutylene terephthalate (PBT), polytrimethylenterephthalate (PTT), polyethylennaphthalate (PEN), polyethylene adipate (PEA), polybutylene succinate (PBS), polyglycolic acid (PGA), polylactic acid (PLA), polycaprolactone (PCL), polyhydroxybutyrate (PHB), poly-(R)-3-hydroxybutyrate (P3HB), poly-4-hydroxybutyrate (P4HB), poly-3-hydroxyvalerate (PHV), poly(3-hydroxybutyrate-co-3-hydroxyvalerate, polymers of any of the monomers for polyamides with OH substituted for $NH_2$, and/or Vectran polyester; polyether ether ketones (PEEK); polyurethanes (PU)—such as PUs comprising polycarbonate(s), polyether(s), and/or polyester(s), and/or toluene diisocyanate (TDI), methylene diphenyl diisocyanate (MDI), 1,6-hexamethylene diisocyanate (HDI), 1-isocyanato-3-isocyanatomethyl-3,5,5-trimethyl-cyclohexane (i.e., isophorone diisocyanate, IPDI), 4,4'-diisocyanato dicyclohexylmethane, ($H_{12}$MDI or hydrogenated MDI), polypropylene oxide (PPO), polyethylene oxide (PEO), poly(tetramethylene ether) glycol, dipropylene glycol, glycerin, sorbitol/water solution, ethylenediamine, triethanolamine, ethylene glycol, 1,4-butanediol (1,4-BDO), 1,6-hexanediol, cyclohexane dimethanol, hydroquinone bis (2-hydroxyethyl) ether (HQEE), ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,4-cyclohexanedimethanol, ethanolamine, diethanolamine, methyldiethanolamine, phenyldiethanolamine, glycerol, trimethylolpropane, 1,2,6-hexanetriol, triethanolamine, pentaerythritol, N,N,N',N'-tetrakis-(2-hydroxypropyl) ethylenediamine, diethyltoluenediamine, and/or dimethylthiotoluenediamine; and/or polyimides—such as polymers of pyromellitic dianhydride, 4,4'-oxydianiline, benzoquinonetetracarboxylic dianhydride, naphthalene tetracarboxylic dianhydride, 4,4'-diaminodiphenyl ether (DAPE), meta-phenylenediamine (MDA), and/or 3,3-diaminodiphenylmethane.

Depending upon the application, useful geotextile or particle polymer Mn may be at least 2.5, 5, 7.5, 10, 12.5, 15, 17.5, 20, 25, 30, 35, 40, 45, 50, 65, 75, 85, 100, 125, 150, 175, 200, 250, 350, 500, or 1000 kDa and/or up to 10,000, 5000, 4000, 3500, 3000, 2500, 2000, 1750, 1500, 1250, 1000, 900, 800, 750, 700, 650, 600, 550, 500, 400, 300, 200, 175, 150, 125, 100, 90, 80, 75, 65, 60, 55, or 50 kDa. Relevant PDIs may vary depending upon application, but will generally be in a range of at least 1.05, 1.1, 1.15, 1.25, 1.33, 1.4, 1.5, 1.75, 2, or 2.5 and/or up to 10, 9, 8, 7, 6, 5, 4, 3, 2.5, 2.25, 2, 1.75, or 1.5.

Aspects of the invention modify existing synthetic filters to provide water and wastewater treatment systems, occasionally abbreviated herein by the designation based upon an exemplary embodiment, BioGtex, amongst many, may be designed to treat wastewater from single homes, businesses, multiple family units, developments, etc., which are not connection to a communal or municipal sewer system. Inventive water treatment systems, including BioGtex, are generally compact, lightweight, and/or recirculating packed-bed filters.

Inventive treatment systems may contain 2, 3, 4, 5, 6, 7, 8, 9, 10, or more layers of nonwoven geotextile fabrics, the fabrics having independent thicknesses of, e.g., at least 2, 2.25, 2.5, 2.6, 2.7, 2.75, 2.8, 2.85, 2.9, 2.95, 3, 3.05, 3.1, 3.15, 3.2, or 3.25 mm and/or up to 5, 4.75, 4.5, 4.4, 4.35, 4.3, 4.25, 4.2, 4.15, 4.1, 4.05, 4, 3.95, 3.9, 3.85, 3.8, or 3.75 mm, that may be fixed to one or more walls of the system. Inventive treatment systems may include recycled plastic particles having average particle diameters/largest dimensional sizes of, e.g., at least 7.5, 8, 8.5, 9, 9.25, 9.5, 9.75, 10, 10.25, 10.5, 10.75, 11, 11.5, 12, or 12.5 mm and/or up to 25, 24, 23, 22.5, 22, 21.5, 21, 20.75, 20.5, 20.25, 20, 19.75, 19.5, 19.25, 19, 18.5, 18, or 17.5 mm, packed between the geotextile fabric layer(s), i.e., all layers or 80, 75, 67, 60, 50, 40, 33, or 25% of the layers, for example, as exemplified in FIG. 1A.

Inventive water treatment systems, including BioGtex, may be configured to receive wastewater from, for example, one or more septic tanks whereby the wastewater may have been pretreated to remove larger solid particles, oil, and/or grease. The wastewater may preferably be recirculated in the inventive systems, including BioGtex, e.g., for at least 4, 5, 6, 7, 8, 9, or 10 cycles and/or up to 20, 18, 16, 15, 14, 13, 12, 11, 10, 9, or 8 cycles, for substantially complete removal of organics and/or nitrogenous compounds from the waste water, e.g., at least 75, 80, 85, 90, 91, 92, 92.5, 93, 94, 95, 96, 97, 97.5, 98, 99, 99.1, 99.5, or 99.9 wt. % of a total weight of the organics and/or nitrogenous compounds. Recirculation may ensure sufficient conduct of the nitrification process, e.g., oxidation of ammonia, $NH_3$, and/or ammonium ions, $NH_4^+$, to nitrate ions, $NO_3^-$, is substantially completed, e.g., at least 75, 80, 85, 90, 91, 92, 92.5, 93, 94, 95, 96, 97, 97.5, 98, 99, 99.1, 99.5, or 99.9 wt. % of a total weight of the ammonia/ammonium is oxidized to nitrate.

Inventive systems may implement one or more recirculation pumps, which may be selected based on the treatment volume or flux, e.g., of at least 50, 100, 150, 200, 250, 300, 350, 400, 450, 500, 750, 1000, 2500, 5000, or more gallons per day and/or up to 20000, 15000, 10000, 7500, 5000, 2500, 1000, 750, or 500 gallons per day. Unlike conventional filters that use sand or other materials for the treatment media, inventive filters may use, e.g., no more than 40, 33, 25, 20, 15, 10, 7.5, 5, 4, 3, 2, 1, or 0.5 wt. %, relative to the total inorganics and/or treatment medium weight, of sand and/or inorganic materials. Inventive systems, including BioGtex may use a geotextile fabric of thickness of, e.g., at least 1, 1.25, 1.5, 1.75, 2, 2.25, 2.5, 2.75, 3, 3.25, 3.5, 3.75, 4, 4.25, 4.5, 4.75, or 5 mm and/or up to 10, 7.5, 7, 6.5, 6.25, 6, 5.75, 5.5, 5.25, 5, 4.75, 4.5, 4.25, or 4 mm, and optionally recycled plastic materials having diameters or largest dimensions in a range of, e.g., at least 15, 16, 17, 18, 19, 20, 22.5, 25, 27.5, or 30 mm and/or up to 75, 70, 65, 60, 55, 54, 53, 52.5, 52, 51, 50, 49, 48, 47.5, 47, 46, 45 mm, packed between geotextile layers, which geotextile layers may be compact, lightweight, and easy-to-maintain.

Inventive treatment systems including BioGtex may include layered geotextiles and (advantageously, recycled) plastic materials configured to capture influent microorganisms, e.g., capable of capturing at least 50, 60, 70, 75, 80, 85, 90, 95, 97.5, 99, or 99.9 wt. % of the influent total microorganismic weight. These captured microorganisms can colonize a depth filter and can decompose substrate adsorbed from percolating wastewater liquid. The practical concern is to provide and sustain high hydraulic capacity by limiting permeability loss, which may be achieved by dispersing biomass within the geotextile fabric(s) and/or on the surface(s) of the plastic pieces, to maintain aerobic and endogenous (near-starved) conditions. High hydraulic capacity can result in a high level of treatment without accumulation of incomplete decomposition products. During the operation of inventive systems/BioGtex continuous improvement in oxygen availability may occur, and/or balancing of the organic loading and the microorganism population, i.e., the food-to-microorganism ratio, to mineralize substrate and excess cell tissue.

Inventive (e.g., BioGtex) systems may exploit a pattern of dose and drain methods to gain a number of advantages, one of which is the need for opportunities for air to reach the biomass and prevent the system from going anaerobic. Our parametric and confirmation studies indicate that the influent sample should be aerated in the wet well located under the system before application to an inventive (e.g., BioGtex) treatment system. The parametric variables include the number of geotextile filter layers, the hydraulic loading rate (HLR), organic loading rate (OLR), organic loading pattern, and provision for passive re-aeration. In certain treatment systems containing one or more geotextile filters, it is possible to reduce total suspended solids (TSS) and 5-day biochemical oxygen demand ($BOD_5$), chemical oxygen demand (COD), total suspended solids (TSS), $NH_4^+$ and the effluent nitrate ($NO_3^-$), as described in the doctoral thesis of Cevat Yaman entitled "Geotextiles as Biofilm Filters in Wastewater Treatment," submitted in the Department of Environmental Engineering at Drexel University, Philadelphia, Pa. (USA), in 2003, and in J. Environ. Eng. 2005, 131(12), 1667-1675, each of which is incorporated by reference herein in its entirety.

Aspects of inventive (e.g., BioGtex) systems may provide more compact and/or more predictable treatment generally by biomass distributed through layers of porous geotextile filter overlying the plastic materials. For example, at least 50, 60, 70, 75, 80, 85, 90, 92.5, 95, 97.5, 98, 99, 99.1, 99.5, or 99.9% of the treatment, including nitrification, may be accomplished before the effluent percolates to the last layer of geotextile layer. An opportunity for pre-aeration to improve aerobic biodegradation may be provided at a wet well configured to receive septic tank effluent.

Aspects of the invention include processes involving: removing suspended material from the influent; growing an active biomass within the fabric(s) and/or on the surface(s) of the plastic pieces; biodegrading, in-place, filtered and adsorbed organic material to full mineralization, i.e., at least 90, 91, 92, 92.5, 93, 94, 95, 96, 97, 97.5, 98, 99, 99.1, 99.5, 99.9, 99.99, or 99.999%, up to 100%, mineralization.

Aspects of the invention control and modulate the biomass distribution. The inventors have found that only certain nonwoven geotextiles can provide satisfactory biomass hosting. Certain continuous filament type of needle-punched nonwovens have shown excellent performance for treating biomass, and aspects of the invention employ one or more of such nonwovens. The "treating" biomass, i.e., the biomass suitable to decompose organics and nitrogenous compounds in wastewater, generally derives from microorganisms in the influent. Scanning electron microscope (SEM) analysis has shown treating biomass to form a discontinuous plate-shaped floc within the pores of the geotextile. The biomass is generally actually a captive, suspended growth rather than an attached growth, fixed to a medium with one-dimensional substrate and oxygen transfer only. Via adhesion as a suspended growth a desired level of contact between biomass and substrate can be reached without significantly reducing permeability. The biomass can grow and mature to internally provide a sequence of biochemical reactions, including decomposition of carbonaceous constituents and conversion of ammonia and/or ammonium to nitrate.

Relevant nonwovens, especially needle-punched nonwovens, may include fibers or filaments (re)oriented into a (vertical) direction orthogonal to the plane of the geotextile, and/or with no chemical/adhesive bonding, no thermal bonding, no bonding of spunlaid webs, etc. Useful geotextiles may be described in *Advances in Technical Nonwovens* G. Kellie (ed.), London: Woodhead, 2016; *Sustainable Fibres and Textiles*, S. S. Muthu (ed.), London: Woodhead, 2017; *Applications of Nonwovens in Technical Textiles*, R. A. Chapman (ed.), London: Woodhead, 2010; *Process Control in Textile Manufacturing*, A. Majumdar et al. (eds.), London: Woodhead, 2013; each of which is incorporated by reference herein in its entirety. Useful geotextiles may be made without saturation adhesive bonding, spray adhesive bonding, foam bonding, powder application, print bonding, discontinuous bonding, hot calendering, belt calendering, through-air thermal bonding, ultrasonic bonding, and/or radiant heat bonding.

Needle-punched nonwovens may be made by punching with, e.g., at least 3000, 3500, 3750, 4000, 4250, 4500, 4750, 5000, 5250, 5500, 5750, 6000, 6250, or 6500 needles/$m^2$ and/or up to 10000, 9500, 9000, 8500, 8000, 7750, 7500, 7250, 7000, 6750, 6500, 6250, 6000, 5750, 5500, 5250, or 5000 needles/$m^2$. The punch density may also be, e.g., at least 25, 35, 40, 45, 50, 55, 65, 75, 85, 100, 125, or 150 punches/$cm^2$ and/or up to 500, 450, 425, 400, 375, 350, 325, 300, 275, or 250 punches/cm². Needle-punched filters useful within the scope of the invention may have a mass per surface area of, e.g., at least 25, 35, 50, 65, 75, 100, 125, 150, 175, 200, 225, 250, 300, 350, or 500 g/m² and/or up to 3000, 2750, 2500, 2250, 2000, 1750, 1500, 1250, 1000, 750, 500, 250, 200, or 150 g/m². Useful geotextiles may have a thickness of, e.g., at least 0.25, 0.33, 0.4, 0.5, 0.75, 0.85, 1, 1.25, 1.5, 2, 3, 4, or 5 mm and/or up to 20, 17.5, 15, 12.5, 10, 9, 8, 7, 6, or 5 mm. Useful geotextiles may have a bulk density of, e.g., 0.04, 0.045, 0.05, 0.055, 0.06, 0.065, 0.07, 0.075, 0.08, 0.085, 0.09, 0.095, or 0.1 g/cc and/or up to 0.2, 0.175, 0.15, 0.14, 0.13, 0.125, 0.12, 0.115, 0.105, 0.1, 0.095, 0.09, 0.085, or 0.08 g/cc. Air permeabilities of relevant geotextiles may be, for example, at least 50, 55, 60, 62.5, 65, 67.5, 70, 72.5, 75, 77.5, or 80 m³/m²/min and/or up to 200, 175, 150, 135, 125, 115, 110, 105, 100, 95, 90, 87.5, 85, 82.5, or 80 m³/m²/min. Sectional air permeabilities of relevant geotextiles may be, for example, at least 0.08, 0.1, 0.12, 0.14, 0.16, 0.18, 0.2, 0.22, 0.24, 0.25, 0.26, 0.27, 0.28, 0.29, or 0.3 m³/m/min and/or up to 0.4, 0.38, 0.36, 0.34, 0.32, 0.31, 0.3, 0.29, 0.28, 0.27, 0.26, 0.25, 0.24, 0.23, 0.22, 0.21, or 0.2 m³/m/min. Useful fabrics may have a linear mass density of fibers of, e.g., 1, 2, 3, 4, 5, 6, 7, 8, 9, or 10 denier and/or up to 15, 14, 13, 12, 11, 10, 9, 8, 7, or 6 denier. Relevant geotextiles may have constituent fiber diameters in a range of from, e.g., at least 5, 6, 7, 7.5, 8, 8.5, 9, 9.5, 10, 10.5, 11, 11.5, 12.5, or 15 μm and/or up to 100, 85, 75, 65, 55, 50, 45, 40, 35, 30, 25, 20, 17.5, 15, 12.5, or 10 μm. Relevant geotextiles may have cut fiber lengths in a range of from, e.g., at least 8, 10 12, 13.5, 15, 16, 17, 18, 19, 20, 21, 22.5, or 25 and/or up to 100, 75, 65, 50, 45, 40, 35, 32.5, 30, 27.5, 25, 22.5, or 20 mm. Relevant geotextiles may have volume densities of constituent fibers (according to ASTM C693) in a range of from, e.g., at least 1000, 1250, 1500, 1750, 2000, 2250, 2500, 2600, 2700, 2800, 2900, or 3000 g/cm³ and/or up to 8000, 7500, 7000, 6500, 6000, 5500, 5000, 4500, 4250, 4000, 3750, 3500, 3250, or 3000 g/cm³. Any of these endpoints may alternatively apply as upper or lower endpoints, depending upon the desired application.

Well-designed layered geotextile systems can be superior to conventional onsite systems in reducing the two basic secondary treatment indicators, total suspended solids (TSS) and 5-day biochemical oxygen demand ($BOD_5$), and in nitrifying and partially denitrifying the effluent. Aspects of the inventive include economic and feasibly engineerable/manufacturable application of water treatment systems, e.g., BioGtex, to onsite systems, allowing the infiltration area required to treat a given discharge, i.e., the sustainable hydraulic loading rate. The sustainability may be expressed in terms of permeability, which may correlate to maintaining the biomass in an endogenous state and decomposing organic byproducts. The organic loading rate (OLR) is a relevant feature, which can be modified in aspects of the invention, e.g., to be consistent with the oxygen supply rate. The organic loading rate (OLR) is generally proportional to the hydraulic loading rate (HLR).

Figure 2:
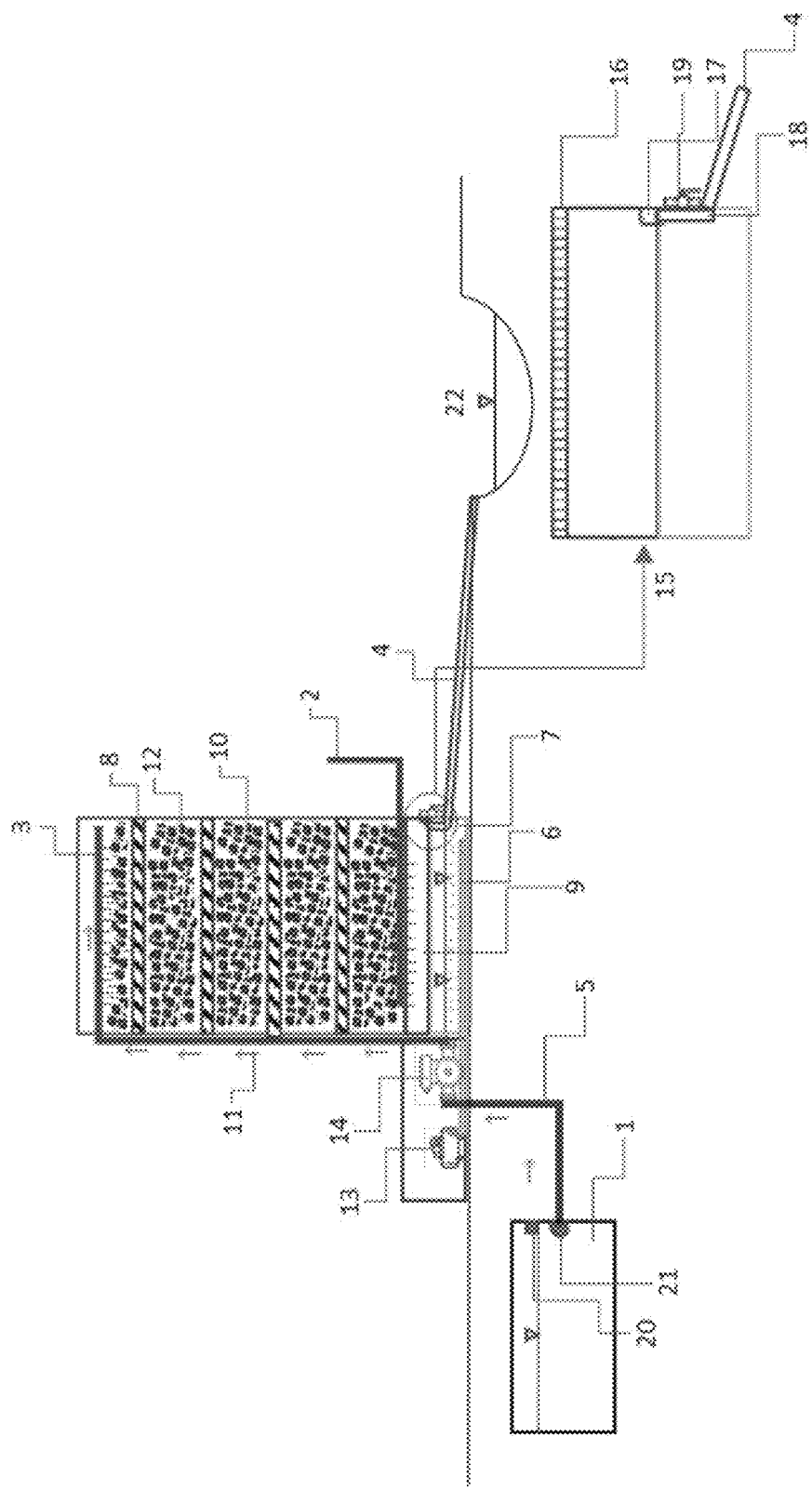
FIG. 2 shows pictorial representation of an exemplary water treatment system.

A general use of inventive (e.g., BioGtex) systems is exemplified in the FIG. 2. Inventive (e.g., BioGtex) systems may be designed to treat wastewater from a 3-bedroom single house. A common design flow rate of 150 gal/day/bedroom may be used, as well as, for example, at least 100, 110, 125, 130, 135, 140, 145, 150, 155, 160, 165, 170, and 175 gal/day/bedroom and/or up to 300, 275, 250, 225, 200, 175, 165, 160, 155, 150, 145, or 140 gal/day/bedroom. Therefore, for example, a design flow rate of 450±5, 10, 15, 20, 25, 33, 40, 50, 67, 75, or 100 gal/day for a 3 bedroom house may be used. Smaller and larger flow rates may be used for. Inventive (e.g., BioGtex) systems may be operated with hydraulic loading rate (HLR) of 5 gal/day/ft², which means for each square foot of treatment unit surface, 5 gallons of wastewater will be applied per day. For example, inventive systems may have HLRs of at least 1, 2, 3, 4, 4.5, 4.75, 5, 5.25, 5.5, 5.75, 6, 7.5, 10, 25, or 50 gal/day/ft² and/or up to 500, 400, 300, 250, 200, 150, 100, 75, 50, 25, 10, 9, 8, 7, 6, 5.5, 5, 4.75, 4.5 gal/day/ft².

For an exemplary system based on a design flow rate of 450 gal/day, a cross sectional area required is 90 ft², based on calculations using Equation 1, below:

$$A = Q/\text{HLR} \qquad \text{Eq. 1,}$$

in which A is area, Q is design flow rate, and HLR is hydraulic loading rate (450 gal/day/5 gal/day/ft²=90 ft²). For a circular cross-section water treatment system, relying on the area of a circle being $\pi r^2$, the diameter (2r), a diameter of a cylindrical geotextile biofilter unit can be calculated to be 10.7 ft, i.e., $90 = \pi \times D^2/4 = D = 10.7$ ft.

Figure 3:
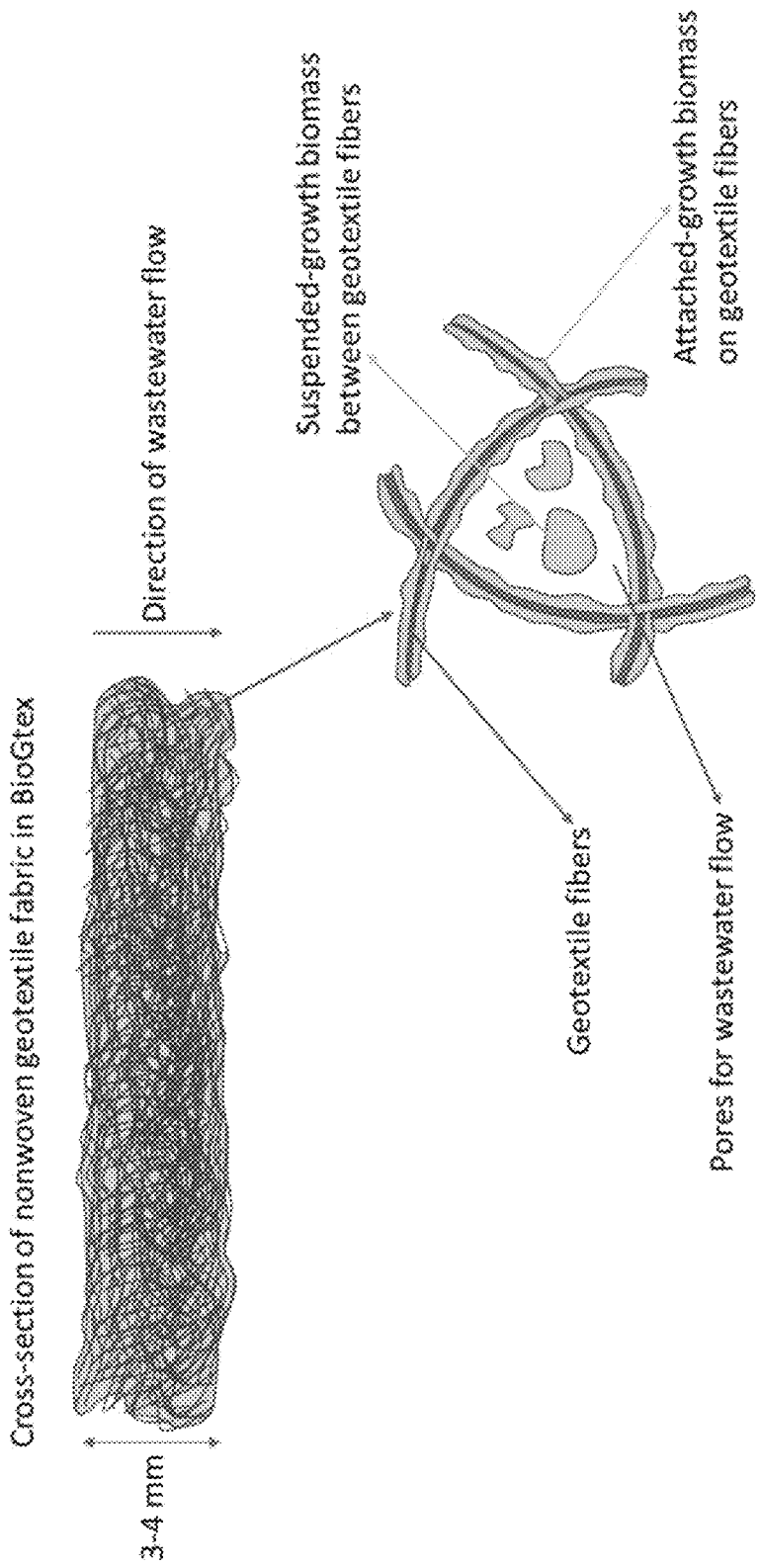
FIG. 3 shows a cross-sectional pictorial representation of an exemplary nonwoven geotextile fabric operating within the scope of the invention, including attached and suspended biomass growth, including a zoomed-in portion on the bottom right.

Aspects of the invention may offer advantages over existing septic effluent treatment systems, including, for example: (1) removing carbonaceous and/or nitrogenous compounds at a higher level, e.g., 1.1, 1.2, 1.25, 1.33, 1.4, 1.5, 1.75, 2, 2.5, 3, 3.5, 5-fold or more, due to the availability of higher surface area, which may be provided by the inserted geotextile filter and the recycled plastic filling material; (2) enhancing biofilm growth in higher amounts and/or rates, and helping remove carbonaceous and nitrogenous compounds at higher rates, likely due to such higher surface areas (compared to conventional sand filters); (3) reducing and/or eliminating clogging due to biomass or suspended solid accumulation, possibly attributable to the higher porosity of filling materials in inventive (e.g., BioGtex) systems compared to sand filters; (4) allowing the use of increased hydraulic loading rates, e.g., at least 3, 3.5, 4, 4.5, 5, 5.5, 6, 6.5, 7.5, or more gal/day/ft², relative to conventional sand filters (around 1 to 2 gal/day/ft², due to solids, biomass, and byproduct accumulation in the pores); (5) facilitating the operation and maintenance of inventive systems relative to known systems, as shown in FIG. 3; (6) allowing and/or simplifying replacement of one or more filter/system components, such as the geotextiles, the plastic filling materials, etc.; (7) simplifying transport and/or handling and sinking cost of the materials, e.g., allowing the use of geotextile and/or optionally recycled plastic filling material, which are lightweight compared to sand filter materials, e.g., sand, gravel, etc.; (8) improving the accuracy and/or predictability of water treatment performance in terms of effluent quality indicators, such as TSS, $BOD_5$, $NH_3$, TN, and/or TP, using conventional wastewater treatment indices (F/M ratio, etc.) relative to customary systems; (9) improving economy and physical feasibility of wastewater treatment by increasing the hydraulic loading rate relative to known systems; and/or (10) increased reliability via more assured oxygen supply and mineralization of carbonaceous and/or nitrogenous material to avoid solids accumulation, relative to known systems.

The removal rates for carbonaceous and nitrogenous compounds in the method and system of the present disclosure are greater than around 97 and 90%, respectively, preferably greater than 98 and 95% or greater than 99 and 98%. Even at very high hydraulic loading rates (HLR), for instance at HLR of 100 gal/ft²·day, it is possible to meet the goal of effluent $BOD_5$ below 10 mg/L. Up to 90% of the $NH_4$ can be converted to $NO^{3-}$. This does not close the nitrogen mass balance. Nitrate is a concern in groundwater at concentrations above 10 mg/L, and it is also a nutrient that can cause eutrophication in receiving waters. Therefore, a complete conversion of $NO^{3-}$ to $N_2$ gas within the BioGtex system is preferred. However, anaerobic environment is needed for the conversion of $NO^{3-}$ to $N_2$ gas. BioGtex is mainly an aerobic system, however, as the biofilm layer thickens in the BioGtex geotextile/plastic particle media, an inner anaerobic layer can form, at which point some denitrification will occur in the geotextile and plastic particle comprising containers, which may provide complete nitrogen removal.

Aspects of the invention may provide water (e.g., BioGtex) treatment systems which improve over known systems in using easier to transport, less expensive, and/or easier to handle system materials, e.g., with components of lightweight materials. Aspects of the invention may include sufficient oxygen supply and/or flux such that leachate chemical oxygen demand (COD) of 100,000 mg/L, i.e., approximately 100 times higher than the COD of septic effluent, does not clog geotextile filters after 1.5, 2, 2.5, 5, 7.5, 10, 15 or 20 years in use.

Inventive water treatment systems may include a reactor space filled with (optionally recycled) plastic materials. Inventive water treatment systems may include 3, 4, 5, or more layers of nonwoven geotextile filters, which may be independently placed vertically, diagonally (e.g., 15, 30, 45, 60, or 75°), or horizontally relative to the direction of gravity. Inventive water treatment systems may recirculate/recycle wastewater 4, 5, 6, 7, 8, 9, 10 or more times per each volume of wastewater treated. Inventive water treatment systems may provide a space for wastewater to be stored, e.g., a tank that may be under the system, wherein the wastewater may be aerated before it is fed to the system. Treated wastewater may be filtered by gravity and/or with pump(s) to the pre-treatment space/tank and be mixed with the stored wastewater. After completing the recirculation cycles, the treated water is discharged into nearby water body, such as surface water, a creek/river, a sea, an ocean, etc.

BioGtex systems may be intended for the treatment of wastewater from a single house that generates, for example, 450-gal wastewater per day. The wastewater may be generated from both bathroom(s) and the kitchen. A typical effluent volume for a 3-bedroom house is around 450 gal (ca. 1703 L) of wastewater. The wastewater may first be discharged into a container, such as a septic tank, where the solid particles can settle to the bottom of the tank or be filtered off at, e.g., the outlet of the tank. Oil and grease can be trapped by oil traps and skimming devices placed on the top of the septic tank. The wastewater feeding a BioGtex system may be substantially or completely free of large solid particles, oil, and grease. Total suspended solids (TSS), organic compounds ($BOD_5$), and nitrogenous compounds ($NH_4$—N) may be removed in BioGtex systems.

Layered geotextile fabrics and plastic materials, including recycled plastic materials, are able to capture and/or adsorb, at least temporarily (i.e., for 4, 8, 10, 12, 16, 18, 24, 48, 72, 92, or more hours), influent microorganisms. Captured microorganisms grow on surface(s) of the plastic particles and/or form a depth filter in the geotextile fabric, and such surfaces and/or depth filters can decompose substrates adsorbed from percolating wastewater liquid. Aspects of the invention may provide and sustain high hydraulic capacity by limiting permeability loss, e.g., by dispersing biomass within the geotextile fabric and/or on the surface(s) of plastic particles, to maintain aerobic conditions. Limited permeability loss can result in a thorough wastewater treatment, i.e., decomposition of at least 75, 80, 85, 90, 92.5, 95, 97.5, 98, 99, 99.1, 99.5, or 99.9 wt. % of decomposable matter, nitrogenous wastewater compounds, and/or carbonaceous wastewater compounds, without accumulation of incomplete decomposition products. Inventive systems, such as BioGtex, can continuously improve oxygen availability in operation and can balance organic loading with the microorganism population to mineralize substrates and excess cell tissue.

Inventive (e.g., BioGtex) systems can employ a pattern of dose and drain methods, including allowing air to reach the biomass and prevent the system from going anaerobic. Parametric and confirmation studies have indicated that aeration of the influent sample, e.g., in an aeration tank located, to the side of, under, or over the filter system, before introduction to inventive treatment systems, can aid filtration and decomposition. Such parametric variables include the properties of the geotextile fabrics and the plastic particles, hydraulic loading rate (HLR), and organic loading rate (OLR). Inventive treatment systems containing geotextile fabrics, make it possible to achieve over 90, 91, 92, 92.5, 93, 94, 95, 96, 97, 97.5, 98, 99, 99.1, 99.5, or 99.9 wt. % removal of total suspended solids (TSS), 5-day biochemical oxygen demand ($BOD_5$), and/or $NH_4$—N, individually or cumulatively.

Inventive water treatment systems, such as BioGtex systems, can be characterized by lightweight, compact, and cost effective design, removal of organic and nitrogenous compounds from wastewater, resistance to clogging due to wastewater percolation, long-term uninterrupted operation, simplified operation and maintenance, microorganism growth on surfaces of geotextile fibers and plastic particles (i.e., attached, adhered, and/or adsorbed growth), and/or microorganism growth in suspension in the pores of the geotextile fibers, i.e., suspended and/or unattached growth.

Properties of Geotextile Fabric

Geotextile fabrics for drainage and filtration materials have been used in geotechnical and geo-environmental engineering for decades. The functions of geotextile fabrics include drainage, filtration, and separation. Nonwoven geotextiles are very permeable materials. Therefore, the water permeability of geotextile fabrics normal to the plane is an important parameter that can be used in application. Useful geotextile fabrics in inventive systems, such as BioGtex systems, include highly porous, allowing water to flow through while containing coarse particles. The chemical composition of the geotextile fabric useful for inventive systems may be polymers of, e.g., olefins, such as ethylene, propylene, isobutylene, 1-butene, butadiene, neoprene, etc., styrene, fluorinated monomers, such as tetrafluoroethylene, vinylidene difluoride, hexafluoropropylene, octafluoroisobutene, chlorotrifluoroethylene, etc., and/or condensation polymers of, e.g., ethylene glycol, butylene glycol, ethylene diamine, ethanolamine, hexamethylene diamine, p-phthalic acid, adipic acid, caprolactam, paraphenylenediamine, dodecanediamine, ω-aminolauric acid, etc. For example, polyethylene (PE) and polypropylene (PP) are a thermoplastic polyolefin material which can have several different polymer chain structures depending on the polymerization conditions. Copolymers of ethylene and propylene (or other polymers) and compounds of homopolymers are also relevant, depending upon the application.

Pore size in relevant geotextile fibers described herein relate to the void space between geotextile fibers or apparent opening size (AOS). The AOS of relevant geotextile fabrics in inventive systems is not particularly limited and may be, for example, between 80 and 100 US sieve, e.g., at least 70, 72, 74, 76, 78, 80, 82, 84, 85, 86, 87, 88, 89, or 90 US sieve and/or up to 110, 108, 106, 104, 102, 100, 98, 96, 95, 94, 93, 92, 91, or 90 US sieve, or between 0.15 and 0.18 mm (ASTM D4751), e.g., 0.1, 0.11, 0.12, 0.125, 0.13, 0.135, 0.14, 0.1425, 0.145, 0.1475, 0.15, 0.1525, 0.155, 0.1575, or 0.16 mm and/or up to 0.22, 0.21, 0.205, 0.2, 0.195, 0.19, 0.1875, 0.185, 0.1825, 0.18, 0.1775, 0.175, 0.17, or 0.165 mm.

Useful geotextile fabrics may have a porosity of, e.g., at least 0.65, 0.675, 0.7, 0.725, 0.75, 0.76, 0.77, 0.775, 0.78, 0.79, 0.8, 0.81, 0.82, 0.825, or 0.85 and/or up to 0.975, 0.97, 0.96, 0.95, 0.94, 0.93, 0.925, 0.92, 0.91, 0.9, 0.89, 0.88, 0.875, 0.87, 0.86, or 0.85.

Useful geotextile fabrics may have a thickness of, e.g., at least 2, 2.1, 2.2, 2.3, 2.4, 2.5, 2.6, 2.7, 2.75, 2.8, 2.9, 3, 3.1, 3.2, or 3.25 mm and/or up to 5, 4.9, 4.8, 4.7, 4.6, 4.5, 4.4, 4.3, 4.25, 4.2, 4.1, 4, 3.9, 3.8, 3.75, 3.7, 3.6, or 3.5 mm.

Useful geotextile fabrics may have a permeability of, e.g., at least 2, 2.25, 2.5, 2.6, 2.7, 2.75, 2.8, 2.85, 2.9, 2.9, 3, 3.05, 3.1, 3.15, 3.2, 3.25, 3.3, 3.4, 3.5, 3.75, or $4\times10^{-3}$ m/s and/or up to 7, 6.75, 6.5, 6.4, 6.3, 6.25, 6.2, 6.15, 6.1, 6.05, 6, 5.95, 5.9, 5.85, 5.8, 5.75, 5.7, 5.6, 5.5, 5.25, or $4\times10^{-3}$ m/s.

Useful geotextile fabrics may have a puncture resistance of, e.g., at least 0.2, 0.205, 0.21, 0.215, 0.22, 0.225, 0.23, 0.235, 0.24, 0.245, 0.25, 0.26, 0.275, 0.3, 0.325, or 0.35 kN and/or up to 0.65, 0.625, 0.6, 0.575, 0.57, 0.56, 0.55, 0.54, 0.53, 0.525, 0.52, 0.515, 0.51, 0.505, 0.50, 0.495, 0.49, 0.485, 0.48, 0.475, 0.45, 0.425, or 0.4 kN.

Useful geotextile fabrics may have a trapezoid tear strength of, e.g., at least 0.15, 0.155, 0.16, 0.165, 0.17, 0.175, 0.18, 0.185, 0.19, 0.195, 0.2, 0.21, 0.225, 0.25, 0.275, or 0.3 kN and/or up to 0.51, 0.5, 0.495, 0.49, 0.485, 0.48, 0.475, 0.47 kN.

Useful geotextile fabrics may have a mass per unit area of, e.g., at least 150, 175, 185, 190, 195, 200, 205, 210, 215, 220, 225, 235, or 250 g/m$^2$ and/or up to 450, 425, 420, 415, 410, 405, 400, 395, 390, 385, 380, 375, 367, or 350 g/m$^2$.

Useful geotextile fabrics may preferably comprise polypropylene and/or may be of, e.g., a polymer type of nonwoven needle-punched continuous filament or nonwoven needle-punched stapled fiber. Nonwoven geotextiles are useful materials for the growth of biomass on their surfaces, in their pore spaces, on the fibers, and/or in suspension between the fiber cages. Nonwoven geotextile fabrics can perform well for the biodegradation of organics present in the infiltrating wastewater through the geotextile fabric.

Properties of Plastic Particles Used in BioGtex

Plastic particles useful in inventive (e.g., BioGtex) water treatment systems may be made from a polyolefin, such as polyethylene, polypropylene, neoprene, polybutadiene, etc, at discussed above, or a polyester (PET, PTT, PBT, polylactic acid, polyglycolic acid, PEA, PBS, PHB, PCL, etc.), polyamide (e.g., nylon 6, nylon 6,6, nylon 12, etc.), polystyrene, ABS, silicone rubbers, SBN rubbers, polyurethanes, fluoroelastomers, PTFE, PVDF, etc. Such particles may comprise compounds of any of these, and/or copolymers of these. The materials in useful particles may be surface-treated, e.g., to comprise surface OH, COOH, CONH$_2$, and/or —NR$_2$ groups.

Relevant plastic particles may have an average diameter or average largest dimension of, e.g., at least 7, 8, 9, 10, 11, 12, 13, or 14 and/or at least 25, 24, 23, 22, 21, 20, 19, 18, or 17 mm, with a density of, e.g., at least 25, 27.5, 30, 32.5, 35, 37.5, 40, 42.5, 45, 47.5, 50, 52.5, 55, 57.5, or 60 kg/m$^3$ and/or up to 125, 120, 125, 110, 107.5, 105, 102.5, 101, 100, 99, 98, 97.5, 97, 96, 95, 94, 93, 92.5, or 90 kg/m$^3$. Plastic particles useful within the scope of the invention may be prepared from e.g., at least 50, 60, 70, 75, 80, 85, 90, 95, 97.5, or 100 wt. %, recycled materials.

Useful plastic particles may be prepared as a cylindrical (from plate to rod shaped), spherical, triangular prismic, rectangular (incl. square) prismic, hexagonal prismic, and/or oval shape with a capability of growing biomass on their surfaces. The void fraction of the plastic particles with respect to total particle volume may be adjusted to make space available for biofilm growth and water and air circulation. Generally, the greater the organic load applied, the higher the porosity must be, as the biofilm will be thicker. Plastic particles useful in inventive water treatment systems may have a high surface area for microbial biofilms per unit volume, e.g., void ratios of at least 85, 87.5, 90, 91, 92, 93, 94, 95, 96, 97, or 97.5%. Void ratios of above 75% can be useful to maintain efficient oxygen delivery to the microorganisms and drive efficient performance. The specific surface area of the plastic particles available for the biofilm development per unit bed volume may be, for example, at least 85, 90, 95, 100, 105, 110, 115, 120, or 125 m$^2$/m$^3$ packing material and/or up to 200, 190, 180, 175, 170, 165, 160, 155, or 150 m$^2$/m$^3$ packing material. Either or both of the geotextile fabrics and the plastic particles may allow for the growth of biomass on their surfaces, i.e., plastic particle(s) and/or geotextile fabric(s), and in their pores, particularly the geotextile fabric(s), to thereby biodegrade organics present in the wastewater being treated. Plastic particles may be cleaned before use in inventive water purification systems, but generally need only be sterilized towards the bacteria necessary to conduct the relevant decompositions.

Pretreatment of Wastewater in a Septic Tank

The composition of the wastewater corning to one or more septic tanks (or other pre-storage tanks) of the inventive water treatment system may be a mixture of greywater originating from kitchens, washing machines, showers, etc., and blackwater originating from toilets. Pretreatment of wastewater in the septic tank may remove, for example, solid contaminants from the wastewater to prepare the effluent for final treatment and discharge into the environment. A septic tank or pre-treatment storage container/reservoir in inventive systems will generally be an enclosed watertight container that provides pretreatment of wastewater by separating solids, and optionally further oil and/or grease. Other separative pre-treatment mechanism in the art may also be used. Removal of the solids, e.g., by slowing down the wastewater flow and allowing the solids to settle to the bottom of a pre-treatment tank, while allowing fats, oils, and greases to rise to the surface of the water. A retention time of, e.g., at least 18, 24, 30, or 48 hours may required for the solids to settle. At least 25, 33, 45, 47.5, 50, 52.5, 55, 60, or 65% of the settled solids may undergo decomposition while the rest will generally accumulate as sludge at the tank bottom and may require removal by other means.

Fats, oils, and grease, originating from animal and vegetable sources, can clog wastewater pipes and treatment systems. Separators and/or skimmers for fats, oils, and greases can remove most (independently 85, 90, 92.5, 95, 97.5, 98, 99, 99.1, 99.5, or 99.9 wt. %) or all the substances having a density less than water, insofar as such substances are not dissolved or solubilized in the aqueous phase. Oils and grease are preferably removed in a septic tank or pre-treatment, i.e., before reaching the decomposition portion of inventive water treatment systems, because oils and greases can cause problems in the treatment process. Inventive systems preferably include at least one oil and grease trap/skimmer (20) placed in the septic tank (1) as shown in FIG. 1.

An effluent filter (21) may be placed at the outlet of the septic system to remove solids in the septic tank (1) from exiting into the decomposition stage (containing outlets 3 and 6 to 15) of inventive systems. The effluent filter (21) may be made of slotted plastic, glass, or metal, to allow the liquid to pass through and restrain larger solids.

Distribution of Biomass

Attached growth, in which biofilm coats a solid media, is less mechanically complex and often more robust with respect to varying hydraulic and substrate loadings. As the surface of the biofilm increases, more organics can be adsorbed from the wastewater, and a thick biofilm can provide more diverse microorganisms to biodegrade carbonaceous and nitrogenous constituents.

One of the methods for bringing biomass and substrate into contact includes filtration and tangential flow, typically used in biofilters. Inventive systems can assure intimate contact when the wastewater permeates through geotextile fabric (8) and the plastic particles (12). In tangential contact, wastewater will flow over the biofilm coating geotextile fibers and the plastic particles. The thickness of the biofilm on the geotextile fibers and the plastic particles can be controlled by the hydraulic loading rate (HLR) to optimize substrate transfer. Once the biomass reaches a certain thickness, it can slough off the media.

Biomass also exists as a free floc, dispersed unattached/unadhered through the pores of the geotextile fibers. Wastewater can flow freely through porous biofilms and around the free floc. Such contact between the biomass and the substrate can be referred to as a captive suspended growth system.

Needle-punched geotextiles can have sufficient interior porosity to avoid clogging at the surface generally known to geotextiles when excess suspended solids block the entry pores. Needle-punched nonwoven geotextile fabrics can promote biomass growth mostly in the interior, rather than on the surface.

Biomass growth and distribution can also be modified via the specific surface area of the geotextile fabric and the plastic particles, i.e., surface-to-volume relationship. Surface areas and internal porosities of geotextile fabrics and plastic particles as described above, can allow for useful amounts of biomass growth to maintain satisfactory flux conditions. FIG. 3 depicts an exemplary arrangement of a nonwoven geotextile (here having a thickness of 3 to 4 mm) soaked with wastewater, including a scaled-up representation of individual fibers of the nonwoven geotextile with attached growth on the fibers and suspended growth within the porous between the fibers. As seen in FIG. 3, a dominant mechanism of biomass growth in inventive treatment systems may be in the form of fixed-film, i.e., the attached growth on the fibers depicted on the zoomed-in exemplary representation on the bottom right of FIG. 3.

Inventive (e.g., BioGtex) water treatment systems can also have suspended growth. Attached growth generally takes place on the surface of the geotextile fabric(s), plastic particles, and geotextile fibers. When wastewater, e.g., from a septic tank or other pre-treatment, is fed into an inventive water treatment system, a layer of biomass will typically form on the surface of the geotextile fibers and plastic particles, e.g., having a thickness of at least 10, 25, 50, 100, 250, 500, 750, 1000, 1750, 2000, 2250, 2500, 2750, 3000, 3250, 3333, or 3500 μm and/or up to 7.5, 6.67, 6, 5.5, 5.25, 5, 4.75, 4.67, 4.6, 4.5, 4.4, 4.33, 4.25, 4.15, 4, 3.85, 3.75, 3.67, 3.6, 3.5, 3.4, 3.33, 3.25, 3.15, 3, 2.9, 2.8, 2.75, 2.67, 2.6, or 2.5 mm. After long-term wastewater application to inventive systems, a thickened layer of biofilm will develop on the surface of geotextile fibers and plastic particles. A substantially continuous biofilm layer adhering to the geotextile fibers and plastic surfaces will typically develop. Increased biomass growth will thicken the biofilm and encroach on the liquid transport channels. Maintaining even distribution of the wastewater on the surface of geotextiles and/or plastic particles can allow even growth of biomass on the surface of the geotextile fibers and plastic particles. As the biofilm layer thickens in/on the geotextile fibers and plastic particles, an inner anaerobic layer will generally form. Customary thicknesses of such inner anaerobic layers can be, for example, at least 5, 10, 15, 25, 30, 35, or 40% and/or up to 65, 60, 55, 50, 45, 40, of the attached growth layer thickness. Once the anaerobic layer is formed, some denitrification can occur in inventive systems, which can provide complete nitrogen removal, e.g., at least 75, 80, 85, 90, 91, 92, 92.5, 93, 94, 95, 96, 97, 97.5, 98, 99, 99.1, 99.5, or 99.9 wt. %—or all—of the oxidizable nitrogen-containing compounds in the resident wastewater, depending on its thickness relative to flow and/or activity.

The treating biomass generally forms a discontinuous plate-shaped floc within the pores of the geotextile. The biomass is typically substantially (e.g., at least 50, 60, 70, 75, 80, 85, 90, or 95 wt. % of the biomass) a captive suspended growth rather than an attached growth, fixed to a media with one-dimensional substrate and primarily to only conducing oxygen transfer. The substantially unattached state of biomass can provide sufficient contact between the biomass and the substrate without significantly reducing permeability.

The biomass can grow and mature in an unattached (or attached) state in the inventive systems to internally provide a sequence of biochemical reactions, including decomposition of carbonaceous constituents, generally to gaseous products, such as $CO_2$ and $H_2O$, and conversion of ammonia/ammonium ions to nitrate.

Figure 4:
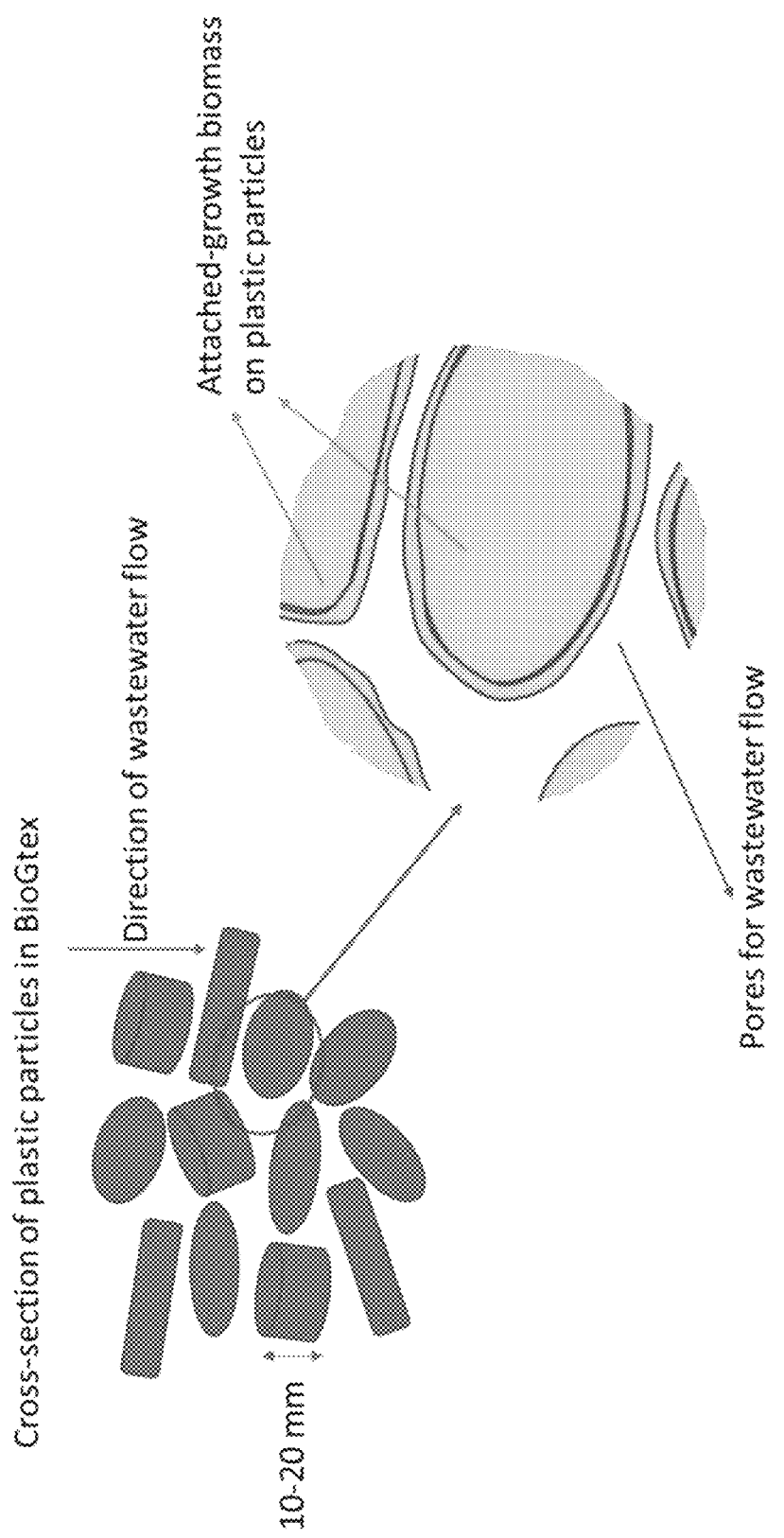
FIG. 4 shows a cross-sectional pictorial representation of exemplary plastic particles illustrating attached biomass growth on the surfaces of the particles in the zoomed in portion on the lower right.

Exemplary cross-sectional view representations of the biomass growth in inventive geotextile fabric and plastic particle arrangements are shown in FIG. 3 and FIG. 4. Geotextile fabrics can typically support more biomass compared to other filter media used in the art. Biomass in geotextile fabrics can calculated or quantified in grams volatile suspended solids (VSS) per $m^2$ of the fabric material. Inventive (e.g., BioGtex) systems may have a mass of biomass of, for example, at least 70, 72.5, 75, 76, 77, 77.5, 78, 78.5, 79, 79.5, 80, 80.5, 81, 81.5, 82, 82.5, 83, 83.5, 84, 84.5, or 85 g/m$^2$ and/or up to 125, 120, 115, 112.5, 110, 107.5, 1050, 104, 103, 102.5, 102, 101.5, 101, 100.5, 100, 99.5, 99, 98.5, 98, 97.5, 96, 95, 92.5, 90, 87.5, or 85 g/m$^2$ of geotextile fabric. Useful geotextile fabrics are not generally limited in thickness, but may be thin, e.g., at least 2, 2.25, 2.5, 2.75, 3, 3.25, 3.5, 3.75, or 4 mm and up to 10, 9, 8, 7, 6, 5.5, 5, 4.5, 4.25, 4, 3.9, 3.8, 3.75, 3.7, 3.65, 3.6, 3.55, 3.5, 3.45, 3.4, 3.35, 3.3, 3.25, 3.2, 3.15, 3.1, 3.05, or 3 mm. Thus, biomass density unit of gram biomass per $m^2$ of geotextile fabric a relevant evaluation. Converting g/m$^2$ to g/m$^3$, the biomass density in geotextile fabric can be, for example at least 10, 11, 12, 12.5, 13, 13.5, 14, 14.5, or 15 kg biomass/m$^3$ of geotextile fabric, and up to 25, 22.5, 20, 17.5, 17, 16.5, 16, 15.5, 15, or 14.5 kg biomass/m$^3$ of geotextile fabric. Such values compare well to other filter materials such as sponge (3 to 6 kg/m$^3$), zeolite (0.044 to 0.090 kg/m$^3$) and ceramsite sand (0.107 to 0.214 kg/m$^3$).

Distribution of Oxygen Sufficient aeration of the wastewater can provide the required dissolved oxygen (DO) for the biochemical oxidation to degrade organic compounds and to enhance nitrification of ammonia and/or ammonium ions. Aeration of the influent wastewater can take place, for example, in an aeration tank located underneath, to the side of, above, or even remote to (e.g., within 10, 5, 2.5, 1, 0.5, 0.25, 0.1, 0.075, 0.05, 0.025, 0.01, or 0.005 km) the inventive geotextile/particle tank system. Aeration can be achieved by an air blower, bubbler, pump, or the like, then the effluent may be pumped to the top of the inventive BioGetx system for gravity filtration downward.

Dissolved oxygen concentration may be measured in the aeration tank to make sure that the DO levels are never below, e.g., 2.75, 3, 3.25, 3.5, 3.55, 3.6, 3.65, 3.7, 3.75, 3.8, 3.85, 3.9, 3.95, 4, 4.05, 4.1, 4.15, 4.2, 4.25, 4.5, 4.75, 5, 5.25, 5.5, 5.75, 6, 7, 8, 9, or 10 mg/L, even maintaining the wastewater at a saturated oxygenation level, e.g., 99.9, 99, 95, 90, 85, 80, 75, 65, 50, 40, 33, 25, or 10% $O_2$ saturated. Oxygen enriched effluent wastewater may be evenly distributed over the inventive geotextile/plastic particle decomposition system by using one or more perforated distribution pipes located at the top of the system. During the resting, residence, or incubation time between recirculation sets, air may be circulate between the geotextile fibers and the plastic particles, allowing oxygen diffusion into the biofilm to provide additional oxygen to the biofilm.

Permeability

The hydraulic performance of inventive systems generally depends on operating conditions, such as hydraulic loading rate (HLR), organic loading rate (OLR), and oxygen supply. Since most of the solid particles can be removed in a pre-treatment device/container and/or septic tank, permeability loss or clogging in geotextile fabric may be primarily due to biomass growth. However, as described above, the biofilm growth between geotextile fibers is typically from inside the nonwoven outwards (i.e., to the outer surfaces of the nonwoven), leaving enough space for liquid flow in the porous nonwoven geotextile structure. In addition, excess substrate and biomass cells may be digested during the rest/residence periods, which may open up, e.g., 50, 60, 70, 75, 80, 85, 90, or 95% of, clogged pores between the fibers.

Recirculation

The number of cycles, i.e., recirculation number, for each volume of wastewater treated may be, for example, 8 counts, or at least 4, 5, 6, 7, 8, 9, 10, or 11 cycles and/or up to 20, 18, 26, 14, 13, 12, 11, 10, 9, or 8 cycles, which—in the case of 8 cycles—means that each volume of wastewater will be filtered through the inventive system 8 times before its final discharge. Recirculation number can be increased or reduced, depending on the treatment efficiency and/or water quality desired. Inventive processes may be set up as batch processes flow processes, or mixtures of these, so that the cycle counts may be "theoretical" decimals of any of the cycle counts discussed, e.g., 4, 5, 6, 7, 8, 9 . . . 20±0.1, 0.15, 0.2, 0.25, 0.3, 0.33, 0.375, 0.4, 0.425, 0.45, 0.475, 0.5 etc.

Biodegradation

The mechanism of contaminant removal in inventive systems generally follows a process involving: surface or internal filtration of suspended organics, growth of biomass, absorption of dissolved contaminants by the attached and suspended biofilm, and finally biodegradation. The degree of biodegradation of the carbonaceous substances in the wastewater can be determined and quantified by the parameter, 5-day biochemical oxygen demand ($BOD_5$).

Nitrification

Nitrification and denitrification are typically more complex and more arduous reactions compared to biodegradation of the carbonaceous substances, because microorganisms that capture decomposed carbonaceous material build up fast, while nitrifying microorganisms build up slowly. Inventive systems may have the potential for the microbial conversion of $NH_4$ (a representation for ammonia and ammonium compounds in the waste water treatment art) to $NO_3^-$, which is commonly referred to as nitrification. The limit on denitrification is often the availability of carbon for cell synthesis, i.e., approximately 2.5±0.1, 0.1667, 0.2, 0.25, 0.33, or 0.5 mg/L $BOD_5$ per mg/L of $NO_3^-$ that is converted to nitrogen gas. Denitrification takes place under anaerobic conditions. Therefore, a complete conversion of $NO_3^-$ to $N_2$ gas within the known systems, and even freshly initiated inventive geotextile and plastic particle comprising containers would be atypical. However, as the biofilm layer thickens in the inventive geotextile/particle media, an inner anaerobic layer can form, at which point some denitrification will occur in the inventive geotextile and plastic particle comprising containers, which may provide complete nitrogen removal, e.g., at least 75, 85, 90, 92.5, 95, 97.5, 99, or 99.9 wt. % of the total weight of nitrogenous compounds.

Design Example

The following example assumes a single house with a wastewater flowrate of 450 gal/day. The wastewater can be first pretreated in the septic tank (1) by natural settling. Oil and grease can also be removed (20) from the surface of the septic tank (1), e.g., using a highly adsorptive material. The wastewater may then be pumped to the aeration tank (7) of the exemplary inventive system for treatment. The septic tank (1) may have an effluent filter (21) at its outlet for filtering out the coarse particles. The wastewater (5) will be pumped (14) to the aeration tank (7), then to the primary decomposition tank (10), comprising the nonwoven geotextile filter (8) and plastic particles (12) for treatment. The following parameters are assumed for the exemplary water treatment system: a flow rate (Q) of 450 gal/day, i.e., ~1703 L/day; a 5-day biological oxygen demand ($BOD_5$) of 150 mg/L; total suspended solids (TSS) value of 40 mg/L; ammonium nitrogen ($NH_4$—N) of 30 mg/L; a hydraulic loading rate (HLR) of 5 gal/day/ft$^2$, i.e., ~1.758 L/day/m$^2$; a dosing cycle of 4 doses/day; a volume for each dose of 112.5 gal/dose (450 gal/day÷4 doses/day), i.e., ~426 L/dose; pump capacity selected (PC) of 100 gal/minute, i.e., ~378.5 L/minute; a dosing duration of 1.125 minutes (112.5 gal/dose÷100 gal/minute); total head (TH) for the pump of 12 ft, i.e., 3.66 m; a pump capacity of 10015.5 lb-ft/min, or TH (ft)×PC (gal/min)×density of water (lb/ft$^3$)×1 ft$^3$/7.48 gal×12 ft.×100 gal/minute×62.43 lb/ft$^3$×(1/7.48)=10,015.5 lb-ft/min); 1 horse power (HP) is 33,000 lb-ft/min; pump capacity needed is 0.30 HP (10,0155.5÷33,000=0.30 HP); the cross sectional area of the cylindrical exemplary inventive system is 90 ft$^2$ (A=Q HLR=450 gal/day÷5 gal/day/ft$^2$=90 ft$^2$; A is $\pi r^2$ or 90=($\pi \times D^2$)/4 then the diameter (D) of the primary decomposition tank (10) is 10.7 ft, i.e., 3.26 m.

A height of the primary decomposition tank (10), i.e., nonwoven geotextile fabrics and plastic particles is 15 ft, i.e., ~4.57 m. A height of the discharge tank is 1.5 ft, i.e., a volume of 135 ft$^3$ with a capacity of holding 1,000 gallons, i.e., ~3785 L, of wastewater. A height of the aeration tank is 1.5 ft, i.e., a volume of 135 ft$^3$ with a capacity of holding 1,000 gallons, i.e., ~3785 L, of wastewater. Thus, the total height of the exemplary inventive water treatment system is 18 ft, i.e., ~5.49 m, for a volume of 1,620 ft$^3$, i.e., ~45,873 L or ~45.9 m$^3$, in cylindrical shape of 10.7 ft diameter, i.e., 3.26 m.

Example Results

The removal rate for organic compounds under 5-day biochemical oxygen demand (BOD$_5$) is shown to be 97% in the above exemplary system. The removal rate for total suspended solids (TSS) is shown to be 95% in the above exemplary system. The removal rate for nitrogenous compounds (NH$_4$—N) is shown to be 90% in the above exemplary system. Therefore the final effluent concentrations from the exemplary inventive system modeled will be: 4.5 mg/L final BOD$_5$; 2.0 mg/L final TSS; 3.0 mg/L final NH4-N.

These concentrations are well below the discharge standards (e.g., U.S. National Pollutant Discharge Elimination System (NPDES), allowable wastewater discharge standards to surface water and groundwater for BOD$_5$ and NH$_4$ are 30 and 10 mg/L, respectively) for surface and groundwater.

While methods of the art, such as Nakao (discussed in the background), can treat wastewater with COD concentrations of 9 to 13.2 mg/L with ca. 50% removal efficiency, inventive systems can treat wastewaters with COD of around 200 mg/L, i.e., roughly 20-fold, which is equal to about 150 mg/L of BOD$_5$, with over 95% removal efficiency.

Referring now to the drawings, wherein like reference numerals designate identical or corresponding parts throughout the several views.

Figure 1B:
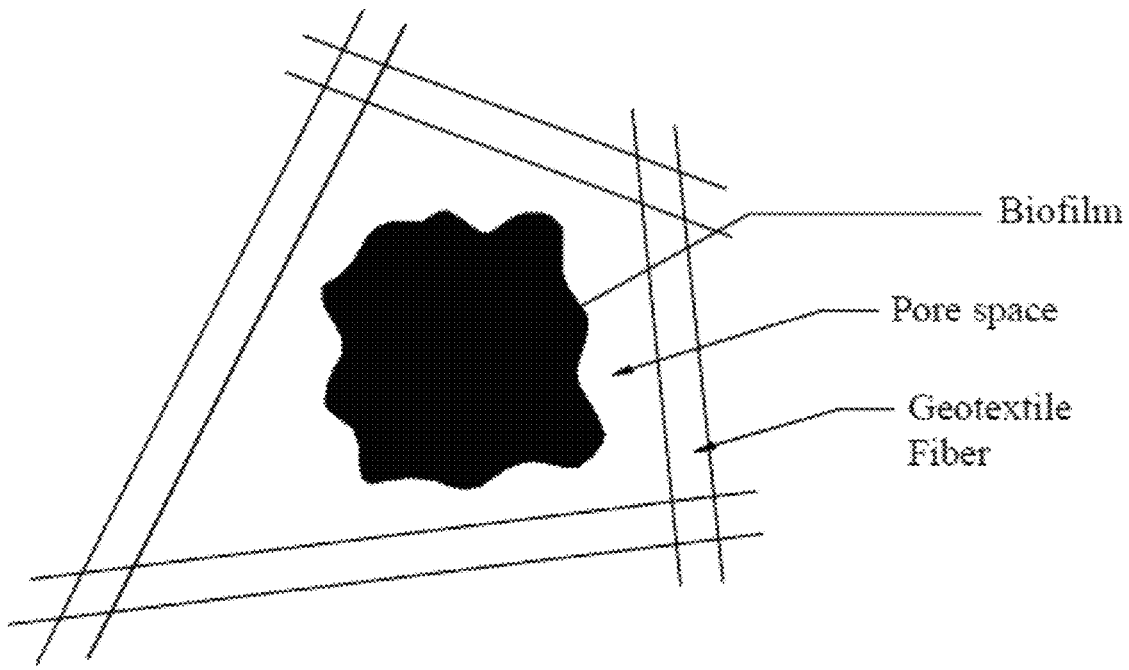
FIG. 1B shows a two-dimensional pictorial representation floc (suspended, unattached) biomass within a fiber network represented linearly for simplicity.

FIG. 1A shows a two-dimensional pictorial representation of an attached biofilm mass within a fiber network represented linearly for simplicity. Generally, the fibers of the nonwoven geotextile will have a non-linear and/or irregular orientation. FIG. 1B shows a two-dimensional pictorial representation floc (suspended, unattached) biomass within a fiber network represented linearly for simplicity.

FIG. 2 shows an exemplary arrangement upon which several aspects of the invention are explained, as described below.

Useful Aeration Tanks

The influent wastewater (5) from a septic tank (1) or pre-treatment device/body should be aerated (6, 13), e.g., in an aeration tank (7) which may be located under the inventive system before introduction into the primary decomposition tank (10)—inventive geotextile (8) and plastic particle (12) comprising containers, as depicted in FIG. 2. Aeration may be accomplished by an air blower (13), then the effluent (11) can be pumped (14) to the top of the primary decomposition tank (10), i.e., inventive geotextile and plastic particle comprising container, for filtration.

Dissolved oxygen concentration can be monitored to make sure that the DO levels remain at or above, e.g., at least 3 to 4 mg/L or any desired level, including the ranges described above. The dimensions of the (e.g., cylindrical) aeration tank (7) may be generally adapted to the size of the building or development for which the inventive systems are implemented, though, for example, a diameter of a useful aeration tank (7) for a 3-bedroom single-family house may be, e.g., at least 9, 9.5, 9.75, 10, 10.25, 10.5, 10.75, 11, 11.5, 12, or 12.5 ft and/or up to 15, 14, 13, 12.5, 12, 11.5, 11, 10.5, or 10 ft. A height of a useful aeration tank (7) for a 3-bedroom single-family house may be, e.g., at least 8, 12, 14, 15, 16, 18, 20, 22, or 24 inches and/or up to 3, 2.75, 2.5, 2.25, 2, 1.75, 1.5, 1.25, or 1 ft. For an exemplary aeration tank (7) of 10.7 ft diameter and 1.5 ft height, which may be used within the scope of the invention, a volume of 135 ft$^3$ or 1,000 gallons may be had.

For an exemplary 3-bedroom house, as discussed above total volume of wastewater requiring treatment is estimated to be roughly 450 gallons/day, which may be pumped into an inventive system in, e.g., 4 equal doses of 112.5 gal/dose. Of course, a variety of dosing approaches are possible, e.g., 2, 3, 4, 5, 6, . . . 10, etc., as are continuous flow arrangements. In the present exemplary process, the first dose of 112.5 gal can be pumped to the aeration tank (7), and the air blower (13) will start running.

Aeration time is important for the conversion of NH$_4$—N to NO$_3^-$, which requires longer time. A DO analyzer may be installed in the aeration tank (7) to monitor the DO levels. After aerating (13) the wastewater in the aeration tank (7) for, e.g., at least 1, 1.25, 1.5, 1.75, 2, 2.25, 2.5, 2.75, or 3 hours or generally until the DO level reaches at least 3 mg/L, then the aeration can be stopped. Post-aeration, the wastewater can be pumped (14) to the top of the inventive geotextile and plastic particle comprising container, i.e., primary decomposition container (10), for filtration. In arrangements wherein the aeration tank (7) is above the primary decomposition tank/container (10), pumps may be avoided. From the base or "post-decomposition" end of the primary decomposition tank/container (10), the effluent may be recycled to the top (i.e., beginning point) of the primary decomposition tank (10), optionally through the aeration tank (7). This recycle may continue until, e.g., 8 cycles are completed, then the treated wastewater can be discharged to a nearby receiving water course (22). After completion of the processing of a first dose in a batch process having several doses, a second dose, e.g., 112.5 gal of wastewater following the 3-bedroom example, if accumulated in the septic tank or pre-treatment device (1), can be pumped to the aeration tank (7) and the process will continue the same as or substantially similarly to that of the first dose. In the example, this process will continue 4 times until 450 gal of wastewater is treated in the inventive system.

Useful Discharge Tanks

An air/water permeable support plate (16) may be placed right above the discharge tank (9) in the primary decomposition container (10). This support plate (16) can hold the plastic particles (12) in place and let air and water through to a discharge tank (9). A discharge tank (9) may be located right above the aeration tank (7) as seen in FIG. 2. The discharge tank (9) may be connected to an aeration tank (9) with a pipe (6), which is controlled with a control valve (19) for discharge/recirculation placed on the outside face of the primary decomposition tank (10). This valve (19) will generally be in the "open" position during the recirculation (18) of the wastewater. The valve (19) can turned off (or to an alternate position), and the treated wastewater will be discharged (4) from the system to a surface water-body (22) or other water outlet, generally nearby.

Wastewater Recirculation

Incoming wastewater (3, via a wastewater distribution system) from the aeration tank (7) should flow through the primary decomposition tank (10) at a rate that allows microorganisms sufficient time to consume the incoming organic material, i.e., 5-day biochemical oxygen demand (BOD$_5$). Therefore, the recirculation number can be used to reach a desired level of treatment. Dosing cycles, organic loading rate, and pump rest periods can help ensure adequate oxygen in the primary decomposition tank's filter media. The biofilm on geotextile filter media (8) and plastic particles (12) includes aerobic microorganisms requiring oxygen. Intermittent wastewater dosing can provide time for air to re-enter the pore spaces of the geotextile fabric (8) after wastewater is applied. Recirculation of wastewater can help to ensure that the geotextile filter media (8) and the plastic particles (12) stay wet. In the exemplary 3-bedroom house example, wastewater recirculation may be, for example, 8 cycles per each volume of wastewater, but it can be reduced or increased depending on the characteristics of the wastewater.

Backwashing

Backwashing (2) can be used to clean the primary decomposition tank (10) filter media (8) and plastic particles (12) to restore and/or improve the treatment capacity. Backwashing (2) can be performed on a periodic basis to prevent excess biomass accumulation and head loss build up. An effective backwash (2) has to balance the removal of excess biomass while keeping adequate attached biomass for wastewater treatment. Water collected from the primary decomposition tank (10) effluent may preferably be used for the backwash (2). Accumulated solid particles can typically be collected and removed from the top of the primary decomposition tank (10), for example, with mechanisms like those useful in the septic or pre-treatment tank (1).

Discharge Pipe

The discharge pipe (4) may be controlled with at least one valve (not numbered) placed on the outside face of the primary decomposition tank (10). As seen in FIG. 2, the discharge pipe (4) system can be directed to a nearby receiving surface water body (22). The diameter of the discharge pipe (4) may be, e.g., at least 4, 5, 6, 7, 8, 9, or 10 cm and/or 30, 25, 20, 18, 16, 14, 12, 10, or 8 cm, depending upon the volume intended to be treated. Such diameters may also be any of these above, translated into American units and/or, e.g., at least 2, 2.5, 3, 3.5, 4, 5, 6, 8, 10, or 12" and/or up to 3, 2.5, 2.25, 2, 1.75, 1.5, 1.25, 1, 0.75, or 0.5'. The discharge pipe (4) may be made of, e.g., concrete, steel, glass-coated steel, PVC, high-impact glass, copper, copper-coated steel, galvanized steel, stainless steel, polypropylene (PP), high-density polyethylene (HDPE), acrylonitrile butadiene styrene (ABS), unplasticized polyvinyl chloride (uPVC), post chlorinated polyvinyl chloride (CPVC), polybutylene (PB-1), polyvinylidene fluoride (PVDF), temperature resistant polyethylene (PE-RT), and/or cross-linked polyethylene (PEX).

FIG. 3 shows a cross-sectional pictorial representation of a nonwoven geotextile fabric operating within the scope of the invention, including attached and suspended biomass growth, including a zoomed-in portion on the bottom right illustrating the attached biomass directly attached to exemplary fibers and illustrating suspended (unattached) biomass within a pore of the nonwoven geotextile fabric.

FIG. 4 shows a cross-sectional pictorial representation of exemplary plastic particles illustrating attached biomass growth on the surfaces of the particles in the zoomed in portion on the lower right.

Figure 5A:
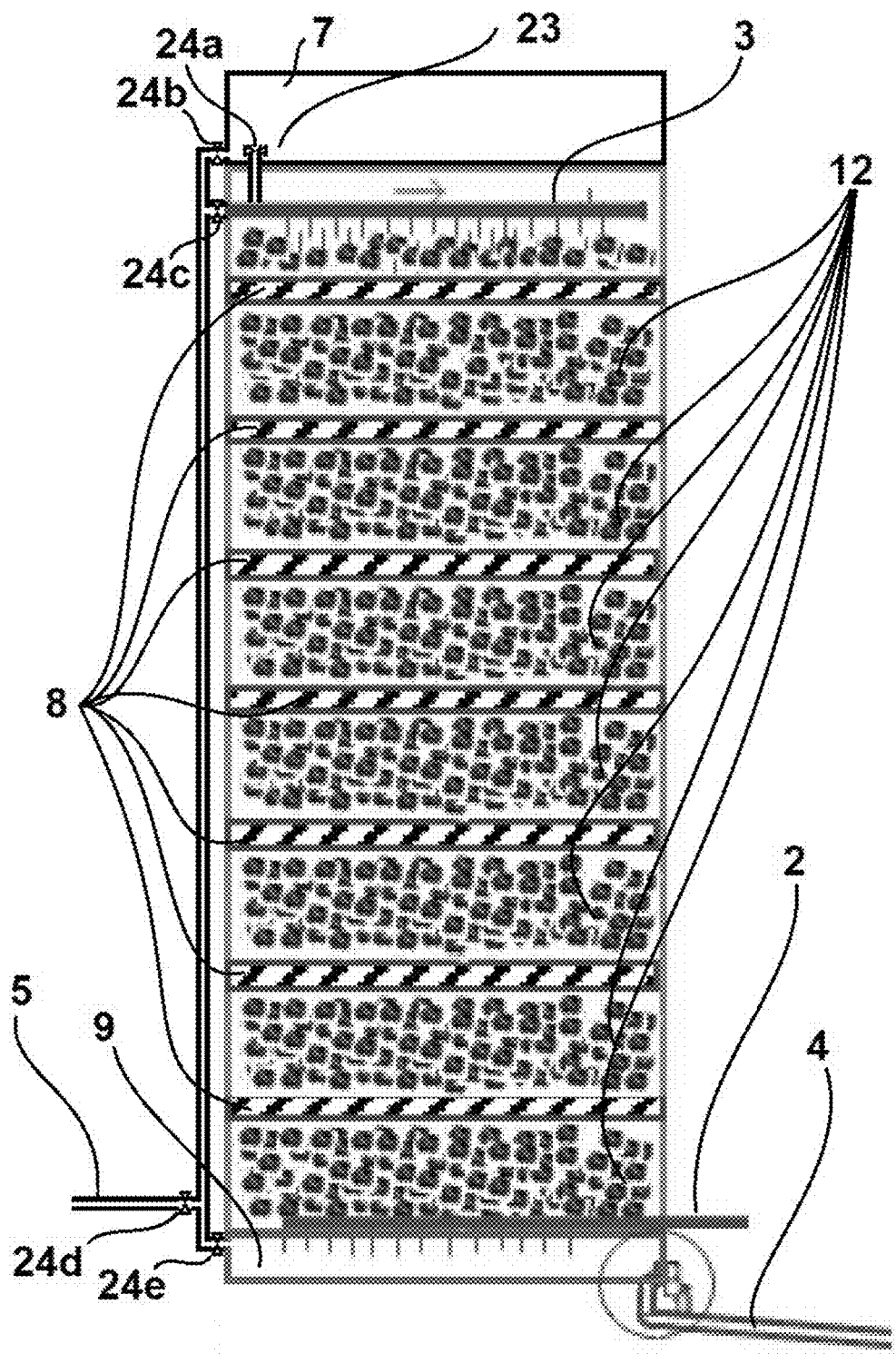
FIG. 5A shows a pictorial representation of water treatment device within the scope of the invention having additional layers and an aeration tank atop the device.
Figure 5B:
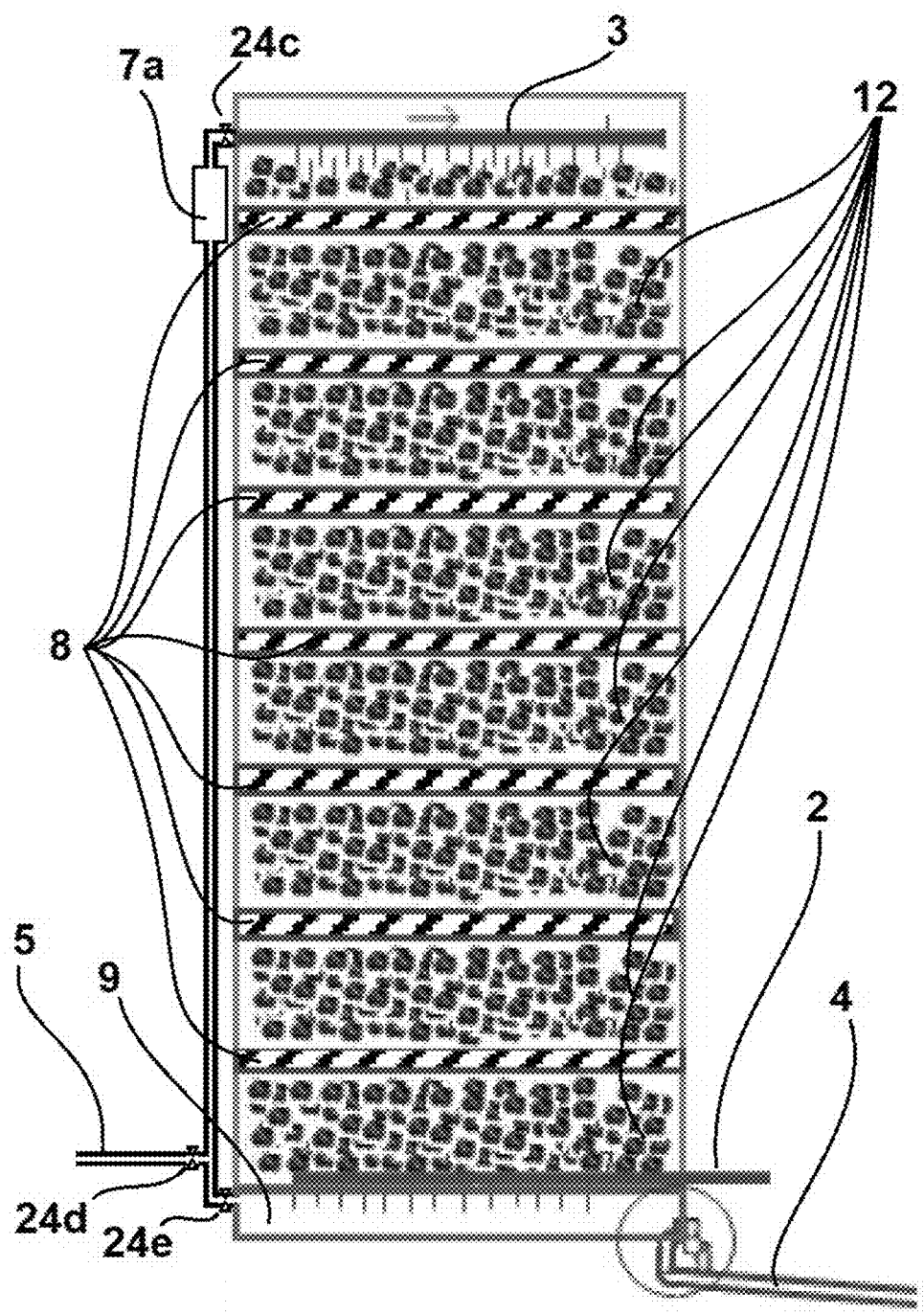
FIG. 5B shows a pictorial representation of water treatment device within the scope of the invention having additional layers and an oxygenation device attached to or embedded into a wastewater feed/effluent recycle pipe.

FIGS. 5A and 5B show pictorial representations of embodiments of inventive water treatment devices having additional layers, shown are seven packed particle layers (12, and an initial particle layer at the upstream end) with an aeration tank (7) atop the device (FIG. 7A) or with an aeration/oxygenation device (7a) attached to or embedded into a wastewater feed/effluent recycle pipe (FIG. 5B). Oxygenation may be achieved by a continuous flow interface and/or section of the piping (including extended coils or reroutes), or by an air compression device or oxygen comprising gas tank associated with the purification system, which may be bubbled into the contaminated water and/or recycled effluent (through 24e). The oxygenation may generally take place anywhere in the system such that it does not inoculate or excessively destroy biomass (e.g., does not reduce nitrification/denitrification). Aeration tanks (7) may be placed to the side, above, or below the primary decomposition tank (10). An aeration tank may be placed so as to absorb solar thermal energy to defray potential thermal heating inputs. Moreover, photovoltaic cells may decorate the housing of the primary decomposition tank (10) so as to provide electrical energy, e.g., to one or more pumps for mass transport of water in the system (e.g., for decomposition, cooling, heating, oxygenating, etc.), to one or more oxygenation devices, such as air compressors, gas regulators, continuous flow oxygenators, etc. While several of the depictions and description suggest that the housing is cylindrical in shape, the shape of the housing/primary decomposition tank (10) may be triangular, rectangular (e.g., square), pentagonal, hexagonal, or octagonal prismic, or elliptical (1.5:1, 2:1, 3:1, 4:1, 5:1, . . . 10:1, etc.), with the geometric designation generally referring to the cross-sectional plane orthogonal to gravity. The tank may also be spherical, e.g., like that of a natural gas container, or conical (at least in part), wherein the geotextiles may be adapted to the cross-section of the tank. The geotextile layers need not contain additional support structures, e.g., metal grids or the like, to maintain the general position of the individual layers, though some applications may employ support elements. Generally, the packed particle layers can be sufficient to support the geotextile layers. In addition, while the drawings show an initial layer of polymer particles, the initial layer may also be a geotextile layer, just as the final layer may be a geotextile layer (though, for practical reasons, will generally be a particle packed layer).

Numerous modifications and variations of the present invention are possible in light of the above teachings. It is therefore to be understood that within the scope of the appended claims, the invention may be practiced otherwise than as specifically described herein.

REFERENCE SIGNS 1 septic tank/pre-treatment body
2 backwash pipe
3 wastewater distribution system
4 water discharge pipe
5 wastewater feeding pipe
6 aeration pipe
7 oxygenation/aeration tank or well
7a oxygenation/aeration piping, e.g., continuous flow
8 geotextitle filter/fabric
9 discharge tank
10 primary decomposition container, BioGtex tank
11 water flow direction
12 (recycled) plastic particles/filling
13 air compressor (or compressed air or oxygen tank)
14 water pump
15 water recirculation/discharge structure
16 air/water permeable support plate
17 water intake structure
18 water discharge pipe for recirculation
19 control valve for discharge/recirculation
20 oil and grease skimmer
21 septic tank effluent filter
22 surface water-body
23 feed
24a-e valves configured to regulate flow

The invention claimed is:

1. A residential water treatment system, comprising:
   a waste water treatment structure,
   a septic tank and/or a solids separation device upstream and in fluid communication with the water treatment structure, and
   a discharge tank downstream and in fluid communication with the waste water treatment structure;
   wherein the waste water treatment structure comprises
   a first geotextile fabric layer;
   a second geotextile fabric layer;
   a third geotextile fabric layer;
   a first filler layer comprising plastic particles, arranged between the first and second geotextile fabric layers; and
   a second filler layer comprising plastic particles, arranged between the second and third geotextile fabric layers, and
   an aeration tank under the first second and third fabric layers and the first and second filler layers,
   wherein the first, second, and/or third geotextile fabric layer comprises at least 75 wt. %, relative to total fabric layer weight, of a nonwoven fabric comprising at least 75 wt. %, relative to total nonwoven fabric weight, of polypropylene or polyethylene terephthalate,
   wherein the aeration tank, geotextile fabric layers and the filler layers are vertically stacked within a housing, and
   wherein the waste water treatment structure is configured such that contaminated water proceeds sequentially through the aeration tank, the first geotextile fabric layer, the first filler layer, the second geotextile fabric layer, the second filler layer, and the third geotextile fabric layer.

2. The residential water treatment system of claim 1, further comprising:
   a fourth geotextile fabric layer; and
   a third filler layer comprising plastic particles, arranged between the third and fourth geotextile fabric layers.

3. The residential water treatment system of claim 1, wherein at least 90 wt. % of the plastic particles are solid plastic.

4. The residential water treatment system of claim 1, wherein the plastic particles comprise at least 50 wt. % recycled polymer, relative to total particle weight.

5. The residential water treatment system of claim 1, wherein the filler layers are packed with the plastic particles, such that the geotextile fabric layers require no further structural support within the housing.

6. The residential water treatment system of claim 1, wherein the first, second, and/or third geotextile fabric layer, independently has a thickness in a range of from 1 to 10 mm, and/or
   wherein the plastic particles having an average largest dimension in a range of from 5 to 60 mm.

7. The residential water treatment system of claim 1, further comprising
   a first separate space, separated by a barrier from the fabric layers and the filler layers, configured to allow an oxygenation of the contaminated water.

8. The residential water treatment system of claim 1, further comprising:
   a second separate space, separated by a barrier from the fabric layers and the filler layers, configured to collect effluent downstream of the water treatment structure.

9. The residential water treatment system of claim 1, further comprising:
   a recycle configured to feed effluent from downstream of the water treatment structure to a point upstream of the water treatment structure.

* * * * *